(12) United States Patent
Kittenplon et al.

(10) Patent No.: US 11,852,559 B2
(45) Date of Patent: Dec. 26, 2023

(54) APPARATUS, SYSTEM, AND METHOD OF DETERMINING ONE OR MORE PARAMETERS OF A LENS

(71) Applicant: 6 OVER 6 VISION LTD., Kfar Saba (IL)

(72) Inventors: Yair Kittenplon, Raanana (IL); Alexander Zlotnik, Petah Tikva (IL); Nadav Magal, Ramat Gan (IL); Orna Bregman Amitai, Tel Aviv (IL); Hadas Goldshtain, Tel Aviv (IL); Ofer Limon, Kfar Saba (IL)

(73) Assignee: 6 OVER 6 VISION LTD.

( * ) Notice: Subject to any disclaimer, the term of this patent is extended or adjusted under 35 U.S.C. 154(b) by 621 days.

(21) Appl. No.: 16/738,246

(22) Filed: Jan. 9, 2020

(65) Prior Publication Data
US 2020/0225508 A1  Jul. 16, 2020

Related U.S. Application Data

(60) Provisional application No. 62/790,614, filed on Jan. 10, 2019.

(51) Int. Cl.
*G01M 11/02* (2006.01)
*G02C 7/02* (2006.01)

(52) U.S. Cl.
CPC .... *G01M 11/0235* (2013.01); *G01M 11/0228* (2013.01); *G02C 7/027* (2013.01)

(58) Field of Classification Search
CPC ......... G01M 11/0221; G01M 11/0228; G01M 11/0235; G01M 11/0257; G02C 13/003; G02C 7/027

USPC .................................................. 356/125, 138
See application file for complete search history.

(56) References Cited

U.S. PATENT DOCUMENTS

| | | | |
|---|---|---|---|
| 6,496,253 B1 | 12/2002 | Vokhmin | |
| 10,321,820 B1 * | 6/2019 | Gollier | G02B 27/0172 |
| 2003/0123054 A1 * | 7/2003 | Keren | G01M 11/0264 |
| | | | 356/128 |
| 2006/0244906 A1 * | 11/2006 | Piers | A61F 2/1613 |
| | | | 351/159.05 |
| 2007/0236701 A1 * | 10/2007 | Neal | A61B 3/1005 |
| | | | 356/512 |
| 2008/0285019 A1 | 11/2008 | Williby et al. | |

(Continued)

FOREIGN PATENT DOCUMENTS

CA   3011793 A1   7/2017
JP   2018523149 A   8/2018
(Continued)

OTHER PUBLICATIONS

International Search Report and Written Opinion for International Patent Application No. PCT/IB2020/050150 dated May 11, 2020, 13 pages.

(Continued)

*Primary Examiner* — Isiaka O Akanbi
(74) *Attorney, Agent, or Firm* — Dorsey & Whitney LLP

(57) ABSTRACT

Some demonstrative embodiments include apparatuses, systems and/or methods of determining one or more parameters of a lens, For example, a computing device may be configured to process at least one depth map including depth information captured via a lens; and to determine one or more parameters of the lens based on the depth information.

26 Claims, 13 Drawing Sheets

(56) References Cited

U.S. PATENT DOCUMENTS

| | | | |
|---|---|---|---|
| 2016/0327808 A1* | 11/2016 | Hatanaka | G02C 13/005 |
| 2018/0038768 A1* | 2/2018 | Hofmann | G01M 11/0228 |
| 2018/0239145 A1* | 8/2018 | Lanman | G06F 3/013 |
| 2019/0072455 A1* | 3/2019 | Limon | G06V 40/193 |
| 2019/0257714 A1* | 8/2019 | Schneider | G01M 11/0235 |

FOREIGN PATENT DOCUMENTS

| | | | |
|---|---|---|---|
| WO | 2017125902 A1 | 7/2017 | |
| WO | 2017134275 A1 | 8/2017 | |

OTHER PUBLICATIONS

Extended European Search Report and Opinion for EP Application No. 20738832.3 dated Sep. 1, 2022.

* cited by examiner

… (1) …

APPARATUS, SYSTEM, AND METHOD OF DETERMINING ONE OR MORE PARAMETERS OF A LENS

CROSS-REFERENCE

This application claims the benefit of and priority from U.S. Provisional Patent application No. 62/790,614, entitled "APPARATUS, SYSTEM AND METHOD OF DETERMINING ONE OR MORE OPTICAL PARAMETERS OF A LENS", filed Jan. 10, 2019, the entire disclosure of which is incorporated herein by reference.

TECHNICAL FIELD

Embodiments described herein generally relate to determining one or more parameters of a lens.

BACKGROUND

Eyeglasses and/or prescription eyeglasses may include lenses assembled in a frame of the eyeglasses.

The lenses may have one or more optical parameters. The optical parameters of a lens may include, for example, a spherical power, a cylindrical power and/or a cylindrical axis.

Determining the spherical power, the cylindrical power, and/or the cylindrical axis of the lens may be useful, for example, if a user of the eyeglasses wishes to duplicate the eyeglasses and/or to produce spare lenses for the eyeglasses.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation.

Furthermore, reference numerals may be repeated among the figures to indicate corresponding or analogous elements. The figures are listed below.

DETAILED DESCRIPTION

Figure 1:
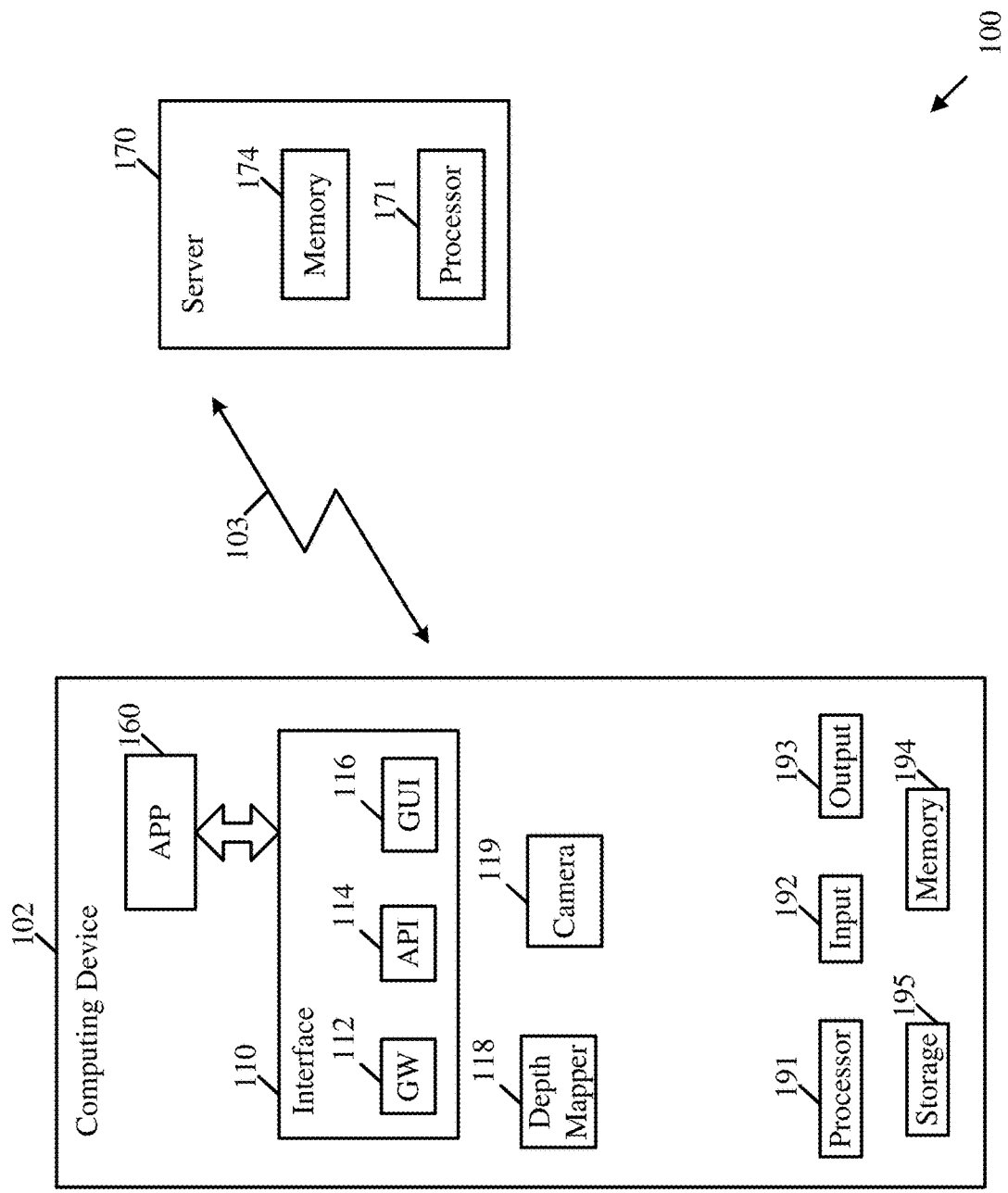
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities capture the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments, for example, may capture the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may capture the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some demonstrative embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a FLASH memory, a rigid magnetic disk, and an optical disk. Some demonstrative examples of optical disks include compact disk-read only memory (CD-ROM), compact disk-read/write (CD-R/W), and DVD.

In some demonstrative embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some demonstrative embodiments, input/output or I/O devices (including but not limited to keyboards, displays, pointing devices, etc.) may be coupled to the system either directly or through intervening I/O controllers. In some demonstrative embodiments, network adapters may be coupled to the system to enable the data processing system to become coupled to other data processing systems or remote printers or storage devices, for example, through intervening private or public networks. In some demonstrative embodiments, modems, cable modems and Ethernet cards are demonstrative examples of types of network adapters. Other suitable components may be used.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a mobile phone, a Smartphone, a mobile computer, a laptop computer, a notebook computer, a tablet computer, a handheld computer, a handheld device, a Personal Digital Assistant (PDA) device, a handheld PDA device, a mobile or portable device, a non-mobile or non-portable device, a cellular telephone, a wireless telephone, a device having one or more internal antennas and/or external antennas, a wireless handheld device, or the like.

Reference is now made to FIG. 1, which schematically illustrates a block diagram of a system 100, in accordance with some demonstrative embodiments.

As shown in FIG. 1, in some demonstrative embodiments system 100 may include a computing device 102.

In some demonstrative embodiments, device 102 may be implemented using suitable hardware components and/or software components, for example, processors, controllers, memory units, storage units, input units, output units, communication units, operating systems, applications, or the like.

In some demonstrative embodiments, device 102 may include, for example, a computing device, a mobile device, a mobile phone, a Smartphone, a Cellular phone, a notebook, a mobile computer, a laptop computer, a notebook computer, a tablet computer, a handheld computer, a handheld device, a PDA device, a handheld PDA device, a wireless communication device, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a Solid State Drive (SSD), or other suitable removable or non-removable storage units. Memory unit 194 and/or storage unit 195, for example, may store data processed by device 102.

In some demonstrative embodiments, device 102 may be configured to communicate with one or more other devices via a wireless and/or wired network 103.

In some demonstrative embodiments, network 103 may include a wired network, a local area network (LAN), a wireless LAN (WLAN) network, a radio network, a cellular network, a Wireless Fidelity (WiFi) network, an IR network, a Bluetooth (BT) network, and the like.

In some demonstrative embodiments, device 102 may allow one or more users to interact with one or more processes, applications and/or modules of device 102, e.g., as described herein.

In some demonstrative embodiments, device 102 may be configured to perform and/or to execute one or more operations, modules, processes, procedures and/or the like.

In some demonstrative embodiments, device 102 may be configured to determine one or more parameters, e.g., one or more optical parameters and/or other parameters, of a lens, e.g., an ophthalmic lens and/or any other type of lens, e.g., provided by a user of device 102 or any other user, e.g., as described below.

In some demonstrative embodiments, an ophthalmic lens may include a lens configured to improve vision.

In one example, the ophthalmic lens may be assembled, or configured to be assembled, in eyeglasses, e.g., of the user of device 102 or any other user.

In another example, the ophthalmic lens may include a contact lens, an Intraocular lens, a swimming goggles lens, and the like.

In another example, the ophthalmic lens may include any other optical lens, e.g., a prescription lens or any other lens, configured to improve vision.

Some demonstrative embodiments are described herein with respect to determining one or more parameters of an ophthalmic lens and/or of eyeglasses. In other embodiments, one or more of the apparatuses, systems and/or methods described herein may be implemented for determining one or more parameters of any other lens and/or any other device including one or more lens.

In some demonstrative embodiments, system 100 may be configured to perform lensometer or lensmeter analysis of the lens, for example, even without using any auxiliary optical means, e.g., as described below.

In some demonstrative embodiments, the one or more parameters of the lens may include a spherical power (also referred to as "sphere"), a cylindrical power (also referred to as "cylinder"), a cylindrical axis (also referred to as "axis") of the lens, a prism power (also referred to as "prism"), an add or addition power (also referred to as "addition"), a center of the lens, a distortion of the lens, and/or any other parameter of the lens.

In some demonstrative embodiments, system 100 may be configured to analyze a focal power and/or near focal length, e.g., of a spherical lens, a focal power, a cylindrical axis and/or a near focal length, e.g., of a cylindrical lens, a difference in a focal length across the lens, e.g., a difference of the focal length between a "distance" part, an "intermediate" part and/or a "near part" of the lens, a focal length map across the lens, and/or any other parameters of the lens, e.g., as described below.

In some demonstrative embodiments, system 100 may include at least one service, module, controller, and/or application 160 configured to determine the one or more parameters of the lens provided by the user of device 102, e.g., as described below.

In some demonstrative embodiments, application 160 may include and/or may perform the functionality of a lensometer module, e.g., configured to perform the lensmeter or lensometer analysis of the lens.

In some demonstrative embodiments, application 160 may include, or may be implemented as, software, a software module, an application, a program, a subroutine, instructions, an instruction set, computing code, words, values, symbols, and the like.

In some demonstrative embodiments, application 160 may include a local application to be executed by device 102. For example, memory unit 194 and/or storage unit 195 may store instructions resulting in application 160, and/or processor 191 may be configured to execute the instructions resulting in application 160 and/or to perform one or more calculations and/or processes of application 160, e.g., as described below.

In other embodiments, application 160 may include a remote application to be executed by any suitable computing system, e.g., a server 170.

In some demonstrative embodiments, server 170 may include at least a remote server, a web-based server, a cloud server, and/or any other server.

In some demonstrative embodiments, the server 170 may include a suitable memory and/or storage unit 174 having stored thereon instructions resulting in application 160, and a suitable processor 171 to execute the instructions, e.g., as descried below.

In some demonstrative embodiments, application 160 may include a combination of a remote application and a local application.

In one example, application 160 may be downloaded and/or received by the user of device 102 from another computing system, e.g., server 170, such that application 160 may be executed locally by users of device 102. For example, the instructions may be received and stored, e.g., temporarily, in a memory or any suitable short-term memory or buffer of device 102, e.g., prior to being executed by processor 191 of device 102.

In another example, application 160 may include a front-end to be executed locally by device 102, and a backend to be executed by server 170. For example, the front end may include and/or may be implemented as a local application, a web application, a web site, a web client, e.g., a Hypertext Markup Language (HTML) web application or the like.

For example, one or more first operations of determining the one or more parameters of the lens may be performed locally, for example, by device 102, and/or one or more second operations of determining the one or more parameters of the lens may be performed remotely, for example, by server 170, e.g., as described below.

In other embodiments, application 160 may include any other suitable computing arrangement and/or scheme.

In some demonstrative embodiments, system 100 may include an interface 110 to interface between a user of device 102 and one or more elements of system 100, e.g., application 160.

In some demonstrative embodiments, interface 110 may be implemented using any suitable hardware components and/or software components, for example, processors, controllers, memory units, storage units, input units, output units, communication units, operating systems, and/or applications.

In some embodiments, interface 110 may be implemented as part of any suitable module, system, device, or component of system 100.

In other embodiments, interface 110 may be implemented as a separate element of system 100.

In some demonstrative embodiments, interface 110 may be implemented as part of device 102. For example, interface 110 may be associated with and/or included as part of device 102.

In one example, interface 110 may be implemented, for example, as middleware, and/or as part of any suitable application of device 102. For example, interface 110 may be implemented as part of application 160 and/or as part of an OS of device 102.

In some demonstrative embodiments, interface 160 may be implemented as part of server 170. For example, interface 110 may be associated with and/or included as part of server 170.

In one example, interface 110 may include, or may be part of a Web-based application, a web-site, a web-page, a plug-in, an ActiveX control, a rich content component, e.g., a Flash or Shockwave component, or the like.

In some demonstrative embodiments, interface 110 may be associated with and/or may include, for example, a gateway (GW) 112 and/or an application programming interface (API) 114, for example, to communicate information and/or communications between elements of system 100 and/or to one or more other, e.g., internal or external, parties, users, applications and/or systems.

In some embodiments, interface 110 may include any suitable Graphic-User-Interface (GUI) 116 and/or any other suitable interface.

In some demonstrative embodiments, application 160 may be configured to determine the one or more parameters of the lens, for example, based on a depth map captured via the lens, e.g., as described below.

In some demonstrative embodiments, the lens may include a spherical lens, a cylindrical lens (also referred to as "sphero-cylindrical lens" or "sphero-cylinder lens"), a bifocal lens, a multifocal lens, or any other type of lens.

In some demonstrative embodiments, device 102 may include a depth mapper 118 (also referred to as "depth sensor") or any other device or system, configured to capture, to create, and/or to determine a depth map of an environment, e.g., as described below.

In one example, application 160 may be configured to determine the one or more parameters of the lens locally, for example, if application 160 is locally implemented by device 102. According to this example, depth mapper 118 may be configured to create the depth map, and application 160 may be configured to receive the depth map, e.g., from depth mapper 118, and to determine the one or more parameters of the lens, e.g., as described below.

In another example, application 160 may be configured to determine the one or more parameters of the lens remotely, for example, if application 160 is implemented by server 170, or if a back-end of application 160 is implemented by server 170, e.g., while a front-end of application 160 is implemented by device 102. According to this example, depth mapper 118 may be configured to create the depth map; the front-end of application 160 may be configured to receive the depth map;

and server 170 and/or the back-end of application 160 may be configured to determine the one or more parameters of the lens, e.g., based on information received from the front-end of application 160.

In one example, device 102 and/or the front-end of application 160 may be configured to send the depth map and, optionally, additional information, e.g., as described below, to server 170, e.g., via network 103; and/or server 170 and/or the back-end of application 160 may be configured to receive the depth map, and to determine the one or more parameters of the lens, for example, based on the depth map from device 102.

In some demonstrative embodiments, depth mapper 118 may include two or more cameras, e.g., a dual camera, a stereo camera, multiple cameras, and or any other camera system configured to create a depth map, e.g., as described below.

In some demonstrative embodiments, depth mapper 118 may include a structured-light stereo camera, e.g., as described below.

In some demonstrative embodiments, depth mapper 118 may include an Infra Red (IR) source and an IR sensor, for example, in a structured-light system, e.g., as described below.

In some demonstrative embodiments, depth mapper 118 may include a Time of Flight (ToF) depth sensor, which may be configured to determine the depth map according to a ToF measurement, e.g., as described below.

In some demonstrative embodiments, depth mapper 118 may include any other additional or alternative sensors, elements, and/or components, which may be configured to create a depth map of an environment.

In one example, one or more calculations described herein may be suitable for implementations with a plurality of different types of depth mapper 118. For example, one or more calculations may be slightly different for the different types, for example, based on IR wavelength and/or visible light spectrum.

In some demonstrative embodiments, application 160 may be configured to determine the one or more parameters of the lens, for example, based on a depth map captured by depth mapper 118, for example, when the lens is positioned in a way that it alters a depth map created by depth mapper 118, for example, using standard configurations, e.g., as described below.

In some demonstrative embodiments, application 160 may be configured to determine the one or more parameters of the lens, for example, based on techniques, calculations, methods and/or algorithms, which may be configured with respect to one or more aspects of a sphero-cylindrical lens, e.g., as described below.

In some demonstrative embodiments, the calculation for the sphero-cylindrical lens may be generalized, for example, to one or more other types of lens, for example, more complex lenses, e.g., imagers, for example, assuming a camera aperture of depth mapper 118 may be relatively small, which may support a local sampling of a tested lens In some demonstrative embodiments, the lens may be modeled and/or considered as a sphero-cylindrical lens, e.g., with three parameters to be determined, for example, e.g., a spherical power, a cylindrical power and a cylindrical axis, of the sphero-cylindrical lens, e.g., as described below.

In one example, the three parameters may be defined, for example, as low order Zernike aberrations of an ideal lens, and/or in any other manner.

In one example, creation of a depth map may be based on a disparity of a point captured or projected from different coordinates, e.g., in the real world.

In some demonstrative embodiments, application 160 may be configured to use depth information and/or depth data captured via a lens, for example, to determine one or more parameters of the lens, e.g., as described below.

In some demonstrative embodiments, application 160 may be configured to process at least one depth map including depth information captured via a lens, e.g., as described below.

In some demonstrative embodiments, application 160 may be configured to determine one or more parameters of the lens based on the depth information, e.g., as described below.

In some demonstrative embodiments, the one or more parameters of the lens may include a spherical power of the lens, a cylindrical power of the lens, a cylindrical axis of the lens, a sign of the lens, and/or an optical center of the lens, e.g., as described below.

In other embodiments, any other additional or alternative parameters of the lens may be determined.

In some demonstrative embodiments, application 160 may be configured to determine the one or more parameters of the lens, for example, for a sphero-cylindrical lens, e.g., as described below.

In some demonstrative embodiments, application 160 may be configured to determine the one or more parameters of the lens, for example, for a bifocal lens and/or a multi-focal lens, e.g., as described below.

In some demonstrative embodiments, application 160 may be configured to instruct a user, e.g., via GUI 116, to position the lens between depth sensor 118 and an object, such that the depth information may include depth information of the object captured by the depth sensor 118 via the lens, e.g., as described below.

In some demonstrative embodiments, application 160 may be configured to identify in the depth map one or more depth values captured via the lens, and to determine the one or more parameters of the lens, for example, based on the one or more depth values captured via the lens, e.g., as described below.

In some demonstrative embodiments, application 160 may be configured to identify in the depth map a depth value corresponding to the object, and to determine the one or more parameters of the lens based on the depth value corresponding to the object, a first distance, and a second distance, e.g., as described below.

In some demonstrative embodiments, the first distance may be between the object and the depth sensor 118, e.g., as described below.

In some demonstrative embodiments, the second distance may be between the depth sensor and the lens, e.g., as described below.

In some demonstrative embodiments, application 160 may be configured to identify in the depth map depth information captured not via the lens, and to determine the first distance and/or the second distance, for example, based on the depth information captured not via the lens, e.g., as described below.

In some demonstrative embodiments, application 160 may be configured to identify in the depth map an area corresponding to an element on plane of the lens, and to determine the second distance based on depth information in the area corresponding to the element, e.g., as described below.

In some demonstrative embodiments, the element may include an opaque rim of the lens, a frame holding the lens, and/or any other element attached to the lens, and/or on a same plane of the lens, e.g., as described below.

In some demonstrative embodiments, application 160 may be configured to identify in the depth map an area corresponding a plane including the object, and to determine the second distance, for example, based on depth information in the area corresponding to the plane including the element, e.g., as described below.

In some demonstrative embodiments, the object may include a wall, e.g., as described below.

In other embodiments, the object may include any other flat surface behind the lens, e.g., a table, a floor, and/or the like.

In some demonstrative embodiments, application 160 may be configured to instruct the user to place and/or move the depth sensor 118 and/or the lens between one or more relative positions, e.g., as described below.

In some demonstrative embodiments, application 160 may be configured to instruct the user to move the depth sensor 118 and/or the lens, for example, until reaching a particular setting of the first distance and/or the second distance, e.g., as described below.

In some demonstrative embodiments, application 160 may be configured to instruct the user to position the lens on a mirror, for example, such that the first distance may include an optical distance, which is twice a distance between the depth sensor 118 and the mirror, e.g., as described below.

In some demonstrative embodiments, application 160 may be configured to instruct the user to position the lens, for example, relative to the depth sensor 118, for example, by moving the depth sensor 118 and/or the lens, such that the second distance may be half of the first distance, e.g., as described below.

In some demonstrative embodiments, application 160 may be configured to identify in the depth map an area corresponding to the lens, and to determine the one or more parameters of the lens, for example, based on a dimension of the area corresponding to the lens, e.g., as described below.

In some demonstrative embodiments, application 160 may be configured to determine the one or more parameters of the lens, for example, based on a plurality of different depth maps captured via the lens, e.g., as described below.

In some demonstrative embodiments, the plurality of different depth maps may include at least a first depth map and a second depth map, e.g., as described below.

In some demonstrative embodiments, the first depth map may be captured via the lens, for example, when the lens is at a first position relative to the depth sensor 118, and the second depth map may be captured via the lens, for example, when the lens is at a second position, different from the first position, relative to the depth sensor 118, e.g., as described below.

In some demonstrative embodiments, the first depth map include a depth map captured via the lens, for example, when the lens is at a first rotation angle in a plane of the lens, and the second depth map may include a depth map captured via the lens, for example, when the lens is at a second rotation angle in the plane of the lens, e.g., as described below.

In some demonstrative embodiments, application 160 may be configured to determine the cylindrical axis of the lens and/or the cylindrical power of the lens, for example, based on the first and second depth maps, e.g., as described below.

In some demonstrative embodiments, application 160 may be configured to determine the one or more parameters of the lens, for example, based on a single depth map captured via the lens, e.g., as described below.

In some demonstrative embodiments, application 160 may be configured to identify in the depth map one or more first depth values captured via the lens, and one or more second depth values captured not via the lens, and to determine the one or more parameters of the lens, for example, based on the first and second depth values, e.g., as described below.

In some demonstrative embodiments, application 160 may be configured to process image information of an image of an object captured by a camera via the lens, for example, when the lens is between the camera and the object, e.g., as described below.

In some demonstrative embodiments, application 160 may be configured to determine a magnification value, for example, based on a magnification between an imaged dimension of the object and an actual dimension of the object, e.g., as described below.

In some demonstrative embodiments, application 160 may be configured to determine the one or more parameters of the lens, for example, based on the depth information and the magnification value, e.g., as described below.

In some demonstrative embodiments, application 160 may be configured to determine the one or more parameters of the lens, for example, based on one or more configuration parameters of the depth sensor 118, for example, from which the depth map is provided, e.g., as described below.

In some demonstrative embodiments, the one or more configuration parameters may include a type of the depth sensor 118, e.g., as described below.

In some demonstrative embodiments, the one or more configuration parameters may include a wavelength of electromagnetic radiation utilized by the depth sensor 118, for example, for generating the depth map, e.g., as described below.

For example, if the lens is made of an optical glass material, e.g., a bk7 material, the lens may have a first refractive index, e.g., of 1.5185, for a first wavelength, e.g., for a wavelength of 0.55 micrometers, and/or a second refractive index, e.g., of 1.5108, for a second wavelength, e.g., a wavelength of 0.8 micrometers. According to this example, a calculation adjustment may be applied based on the wavelength, for example, an adjustment of about 0.08 diopter for spherical plano convex/concave lens with a 100 mm radius.

In some demonstrative embodiments, application 160 may be configured to determine the one or more parameters of the lens, for example, based on predefined mapping information to map between a plurality of depth-map measurements and a plurality of estimated optical parameters, e.g., as described below.

In some demonstrative embodiments, application 160 may be configured to determine the one or more parameters of the lens by processing the depth information as depth information of a structured-light depth measurement, for example, when depth mapper 118 includes a structured light sensor, e.g., as described below.

In some demonstrative embodiments, application 160 may be configured to determine the one or more parameters of the lens, for example, by processing the depth information as depth information of a ToF depth measurement, for example, when depth mapper 118 includes a ToF sensor, e.g., as described below.

In some demonstrative embodiments, application 160 may be configured to use depth information of a reference object captured via the lens, for example, to determine the one or more parameters of the lens, e.g., as described below.

In some demonstrative embodiments, the lens may be placed between depth mapper 118 and the reference object, for example, to capture depth information of the reference object via the lens, e.g., as described below.

In one example, depth information of the reference object captured via the lens may be different from depth information of the reference object, which is captured not via the lens, e.g., without the lens.

In some demonstrative embodiments, application 160 may be configured to determine the one or more parameters of the lens, for example, based on a thin lens approximation equation, e.g., as follows:

$$\frac{1}{f} = \frac{1}{u} + \frac{1}{v} \tag{1}$$

In some demonstrative embodiments, application 160 may be configured to determine the one or more parameters of the lens, for example, based on the depth information via the lens and a statistical model, for example, instead of, or in addition to, Equation 1, e.g., as described below.

In some demonstrative embodiments, application 160 may be configured to use a data set of lens-power versus depth-data measurements, to fit the data set to an empiric model, for example, using data interpolation, or any learning process, and to use the data set, for example, to predict a lens-power of a tested lens, e.g., as described below.

In some demonstrative embodiments, an accuracy of the one or more estimated parameters of the lens may be based, for example, on a resolution of the depth map, which may be different for different systems and/or depth mappers.

In one example, using a composition including several different depth maps may improve an accuracy of the one or more estimated parameters of the lens, e.g., as described below.

In some demonstrative embodiments, application 160 may be configured to determine the one or more parameters of the lens, for example, based on depth information of a reference object, and depth information of the reference object via the lens, e.g., as described below.

In some demonstrative embodiments, application 160 may be configured to trigger, control, and/or cause depth mapper 118 to capture a first depth map, without the lens, including depth information of the reference object, when captured without the lens; and to capture a second depth map including depth information of the reference object captured via the lens, e.g., as described below.

In some demonstrative embodiments, application 160 may be configured to determine the one or more parameters of the lens, for example, based on the first depth map and the second depth map, e.g., as described below.

In some demonstrative embodiments, application 160 may be configured to determine a first estimated distance of the reference object when the reference object is captured without the lens, for example, based on the first depth information; to determine a second estimated distance of the reference object when captured via the lens, for example, based on the second depth information; and to determine the one or more parameters of the lens, for example, based on the first and second estimated distances, e.g., as described below.

In some demonstrative embodiments, application 160 may be configured to determine the one or more parameters of the lens, for example, based on a plurality of depth maps corresponding to a respective plurality of rotations of the lens ("lens rotations"), e.g., as described below.

In some demonstrative embodiments, the lens rotation of the lens may include a relative rotation and/or angle between the lens and the depth mapper 118, for example, with respect to at least one axis, e.g., as described below.

In some demonstrative embodiments, for example, the lens rotation may include a relative rotation and/or angle with respect to an axis of the lens, an axis of the depth mapper 118, and/or at least one predefined axis, e.g., as described below.

In some demonstrative embodiments, application 160 may be configured to instruct the user of device 102, e.g., via GUI 116 or any other interface, to change a relative rotation between device 102 and the lens, for example, according to the plurality of lens rotations of the lens, e.g., as described below.

In one example, the user of device 102 may be instructed to change the relative rotation of the lens by rotating the lens.

In another example, the user of device 102 may be instructed to change the relative rotation of the lens by rotating device 102.

In another example, the user of device 102 may be instructed to change the relative rotation of the lens by rotating both the lens and device 102.

In some demonstrative embodiments, application 160 may be configured to determine the one or more parameters of the lens, for example, based on an image, e.g., a Red, Green Blue (RGB) image and/or any other type of image, of the reference object via the lens, for example, in addition to the depth information of the reference object via the lens, e.g., as described below.

In some demonstrative embodiments, application 160 may be configured to trigger, control, and/or cause depth mapper 118 to capture a depth map without the lens, e.g., when the lens is not between depth mapper 118 and the reference object, including depth information of the reference object and an image of the reference object, for example, using a camera 119; and to capture a second image of the reference object via the lens, for example, using the camera 119, e.g., as described below.

In one example, camera 119 may be part of depth mapper 118. In another example, camera 119 and depth mapper 118 may be implemented as separate elements of device 102.

In some demonstrative embodiments, application 160 may be configured to determine the one or more parameters of the lens, for example, based on the depth map and the first and second images, e.g., as described below.

In some demonstrative embodiments, the reference object may include one or more features having one or more respective sizes, e.g., as described below.

In some demonstrative embodiments, application 160 may be configured to determine the one or more parameters of the lens, for example, based on a comparison between one or more first sizes of the features in the first image, and one or more second sizes of the features in the second image, e.g., as described below.

In some demonstrative embodiments, the lens may include a spherical lens, and application 160 may be configured to determine the one or more parameters of the spherical lens, for example, by determining a spherical power of the spherical lens, e.g., as described below.

In some demonstrative embodiments, application 160 may determine the spherical power of the spherical lens, for example, based on a first depth map including depth information of a reference object, and a second depth map including depth information of the reference object via the lens, e.g., as described below.

Figure 2:
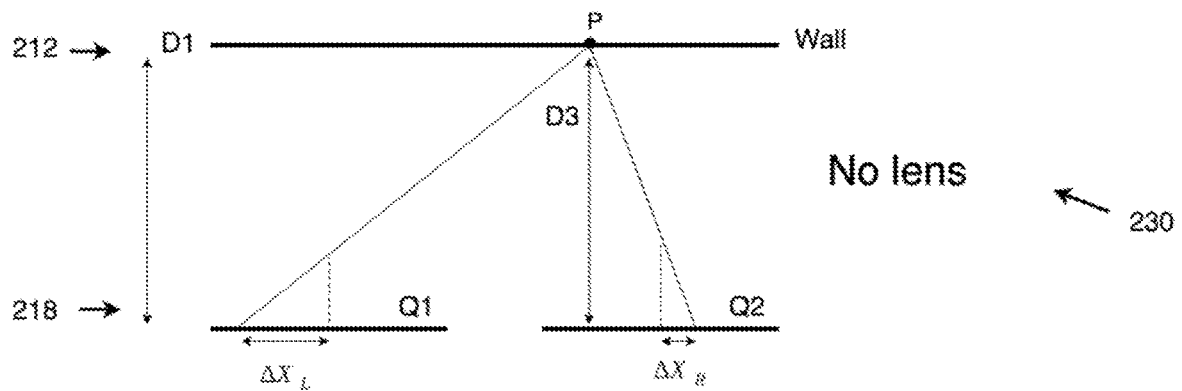
FIG. 2 is a schematic illustration of three measurement schemes, in accordance with some demonstrative embodiments.
Figure 2:
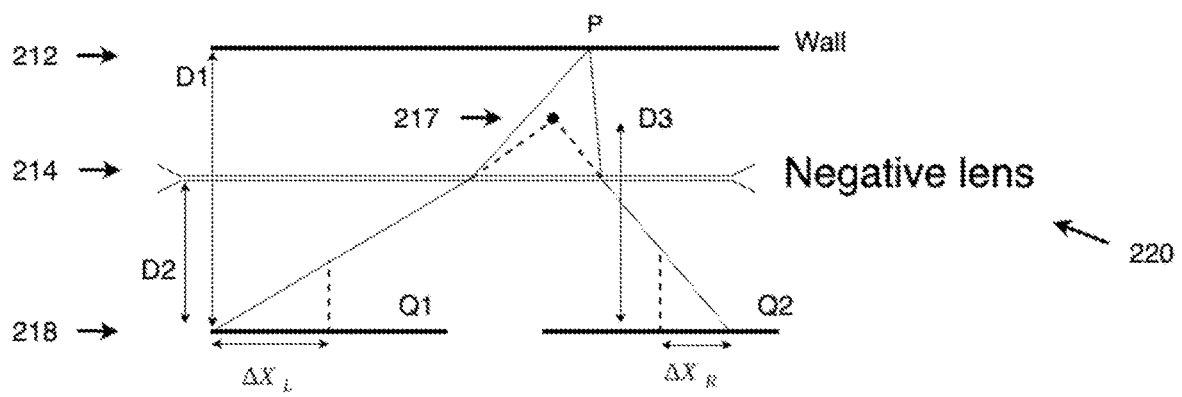
Figure 2:
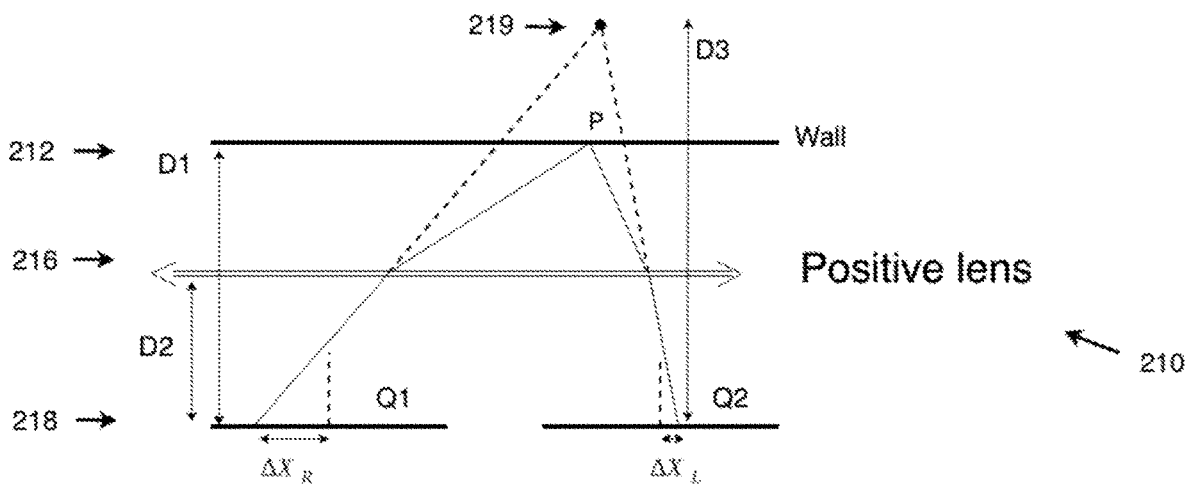

Reference is made to FIG. 2, which schematically illustrates measurement schemes 210, 220 and 230, in accordance with some demonstrative embodiments.

In some demonstrative embodiments, measurement schemes 210, 220 and 230 may be used to determine a spherical power of a spherical lens.

As shown in FIG. 2, a depth mapper 218 may include elements, denoted "Q1 and Q2", e.g., dual cameras, a stereo camera, or an IR source and sensor in a structured-light system, which may be utilized to capture a depth map including depth map information corresponding to a reference object 212, e.g., a wall, at a distance, denoted "D1", from depth mapper 218.

As shown in measurement scheme 210, depth mapper 218 may determine a depth distance, denoted "D3", of a point, denoted "p", of the reference object 212, for example, when there is no object between the reference object 212 and depth mapper 218.

As shown in measurement scheme 220, placing a lens 214, e.g., a negative lens, between the reference object 212 and depth mapper 218, e.g., at a distance, denoted "D2", from depth mapper 218, may change the captured depth distance D3 of the point p. For example, the depth information from depth mapper 218 of the point p via the lens 214 may represent a location 217.

As shown in measurement scheme 230, placing a lens 216, e.g., a positive lens, between the reference object 212 and depth mapper 218, e.g., at the distance D2 from depth mapper 218, may change the captured depth distance D3 of the point p. For example, the depth information from depth mapper 218 of the point P via the lens 216 may represent a location 219.

In one example, object 212 may be located at the distance D1 from depth mapper 218 and optical lens 214 and/or 216 may be placed in between object 212 and depth mapper 218, e.g., at the distance D2, the depth information through the lens 214 and/or 216, e.g., depth distance D3, may be different from D1 and D2, and/or may depend on the optical parameters of the tested lens.

In one example, a relation between the spherical power, denoted P, of the ophthalmic lens and the distances D1, D2, D3 may be determined, e.g., as follows:

$$|U|=D1-D2 \quad |V|=D3-D2 \quad (P=1/f_L) \tag{2}$$

For example, substituting these values in Equation 1 may result in:

$$P = \frac{1}{|u|} + \frac{1}{-|v|} \tag{3}$$

In one example, Equation 3 may be suitable for a diverging lens, e.g., a negative lens, for example, optical lens 214 in measurement scheme 220. However, a similar calculation may be performed for a converging lens, e.g., a positive lens, for example, optical lens 216 in measurement scheme 230.

In some demonstrative embodiments, for example, in one or more scenarios and/or measurement schemes, the distance D2 between lens 214 and depth mapper 218 may be substantially equal to zero, e.g., D2=0. For example, in one scenario the lens 214 may be placed in proximity to, or on, depth mapper 118.

In some demonstrative embodiments, depth mapper 218 may analyze and/or sense object 212 via lens 214, e.g., when the distance D2 is zero.

In one example, a first camera and a second camera of depth mapper 218 may both capture object 212 via lens 214, for example, when depth mapper 218 is implemented using two cameras.

In another example, a structured light projector of depth mapper 218 may project a structured object via lens 214, and a depth sensor of depth mapper 218 may sense the structured object via lens 214, for example, when depth mapper 218 is implemented using a structured light projector. For example, a signal of a depth sensor of depth mapper 218 may go through the lens 214 and may be returned to an IR camera of depth mapper 218 through the lens 214.

According to these embodiments, application 160 (FIG. 1) may be configured to determine the one or more optical parameters of the lens 214, for example, according to Equation 3, when the value of the distance D2 is zero.

In some demonstrative embodiments, a sensor of depth mapper 218 may capture or sense an object 212 not via lens 214.

In one example, the first camera of depth mapper 218 may capture object 212 via lens 214, while the second camera of depth mapper 218 may capture object 212 not via lens 214.

In another example, the structured light projector of depth mapper 218 may project the structured object via lens 214, while the depth sensor of depth mapper 218 may sense the structured object not via lens 214. For example, a signal of depth mapper 218 may go through the lens 214 and may be returned to an IR camera of depth mapper 218, which may be outside of the area of lens 214.

According to these embodiments, application 160 (FIG. 1) may be configured to determine the one or more optical parameters of the lens 214, for example, using one or more calculations, e.g., as described below.

In some demonstrative embodiments, for example, in one or more scenarios and/or measurement schemes, lens 214 may be placed in proximity to a face of a user, for example, when lens 214 is assembled in eyeglasses, and the user wears the eyeglasses on his face, e.g., normally.

In some demonstrative embodiments, application 160 (FIG. 1) may be configured to instruct the user to hold device 102 (FIG. 1), and/or to capture an image of his face, e.g., a "selfie", while the eyeglasses are on his face.

According to these embodiments, the distance D1 may be determined as a distance between depth mapper 118 (FIG. 1) and a face feature of the face, and/or the distance D2 may be determined as a distance between depth mapper 118 (FIG. 1) and a frame of the eyeglasses.

In some demonstrative embodiments, application 160 (FIG. 1) may be configured to determine the one or more optical parameters of the lens 214, for example, by instructing the user to capture a single image, e.g., to determine a lens power of the lens; or by instructing the user to capture two consecutive images, e.g., a first image with the glasses on the face and a second image without the eyeglasses on the face, and comparing between the first and second images.

Figure 3:
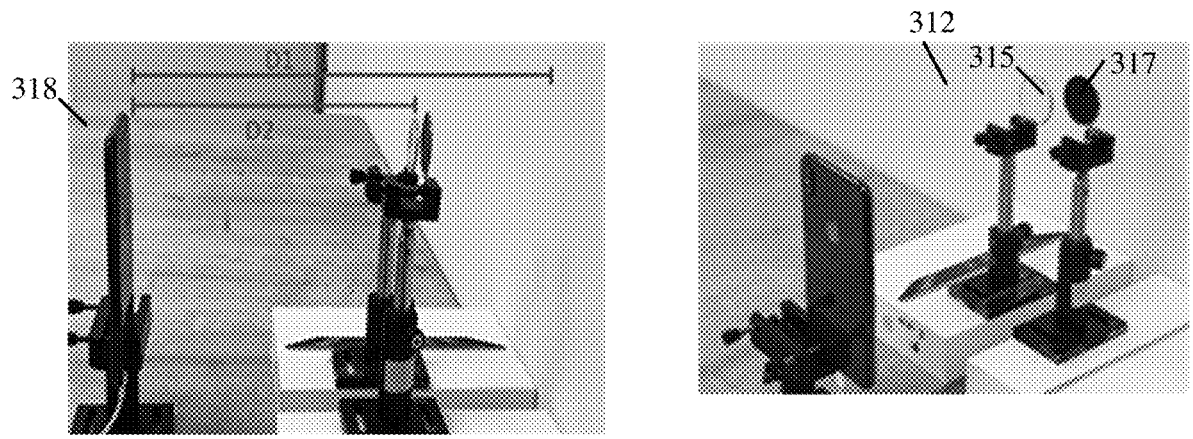
FIG. 3 is an illustration of a measurement system, which may be implemented in accordance with some demonstrative embodiments.

Reference is made to FIG. 3, which schematically illustrates a measurement system 300, in accordance with some demonstrative embodiments.

In some demonstrative embodiments, measurement system 300 may be implemented to determine one or more optical parameters of a lens.

As shown in FIG. 3, measurement system 300 may include a depth mapper 318, e.g., a dual-camera, a stereo camera or an IR source and sensor in a structured-light system, a ToF depth mapper, and/or any other type of depth mapper, e.g., implemented by a mobile phone, a lens 315 to be measured, a reference object 312, e.g., a wall, and an opaque object 317, e.g., an opaque lens, which is located at the same distance D2 as lens 315 from depth mapper 318.

Figure 4:
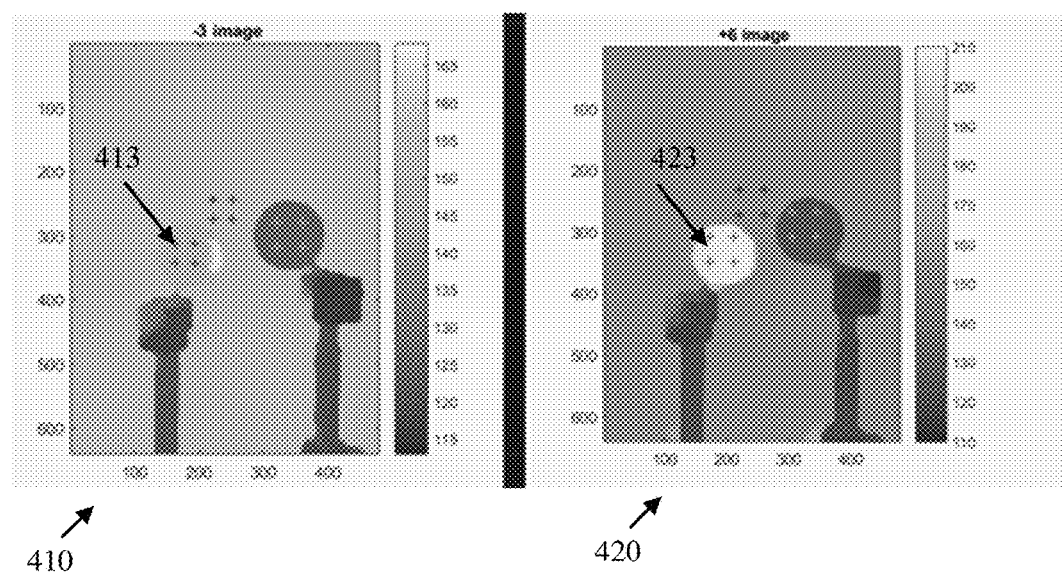
FIG. 4 is a schematic illustration of a first depth map of a first spherical lens, and a second depth map of a second spherical lens, in accordance with some demonstrative embodiments.

Reference is made to FIG. 4, which schematically illustrates a first depth map 410 of a first spherical lens and a second depth map 420 of a second spherical lens, in accordance with some demonstrative embodiments.

In one example, the first spherical lens may include a negative lens, e.g., of −3 diopters, and/or the second spherical lens may include a positive lens, e.g., of +6 diopters.

For example, depth map 410 may be captured using measurement system 300 (FIG. 3), for example, when lens 315 (FIG. 3) includes the negative lens, and/or depth map 420 may be captured using measurement system 300 (FIG. 3), for example, when lens 315 (FIG. 3) includes the positive lens.

As shown in FIG. 4, depth information 413 of the reference object 312 (FIG. 3), e.g., via the positive lens, in depth map 420, may be different from depth information 423 of reference object 312 (FIG. 3), e.g., via the negative lens, in depth map 410, for example, while depth information of the opaque object 317 (FIG. 3) and the wall, e.g., not through the lens, is the same at depth maps 410 and 420.

Figure 5:
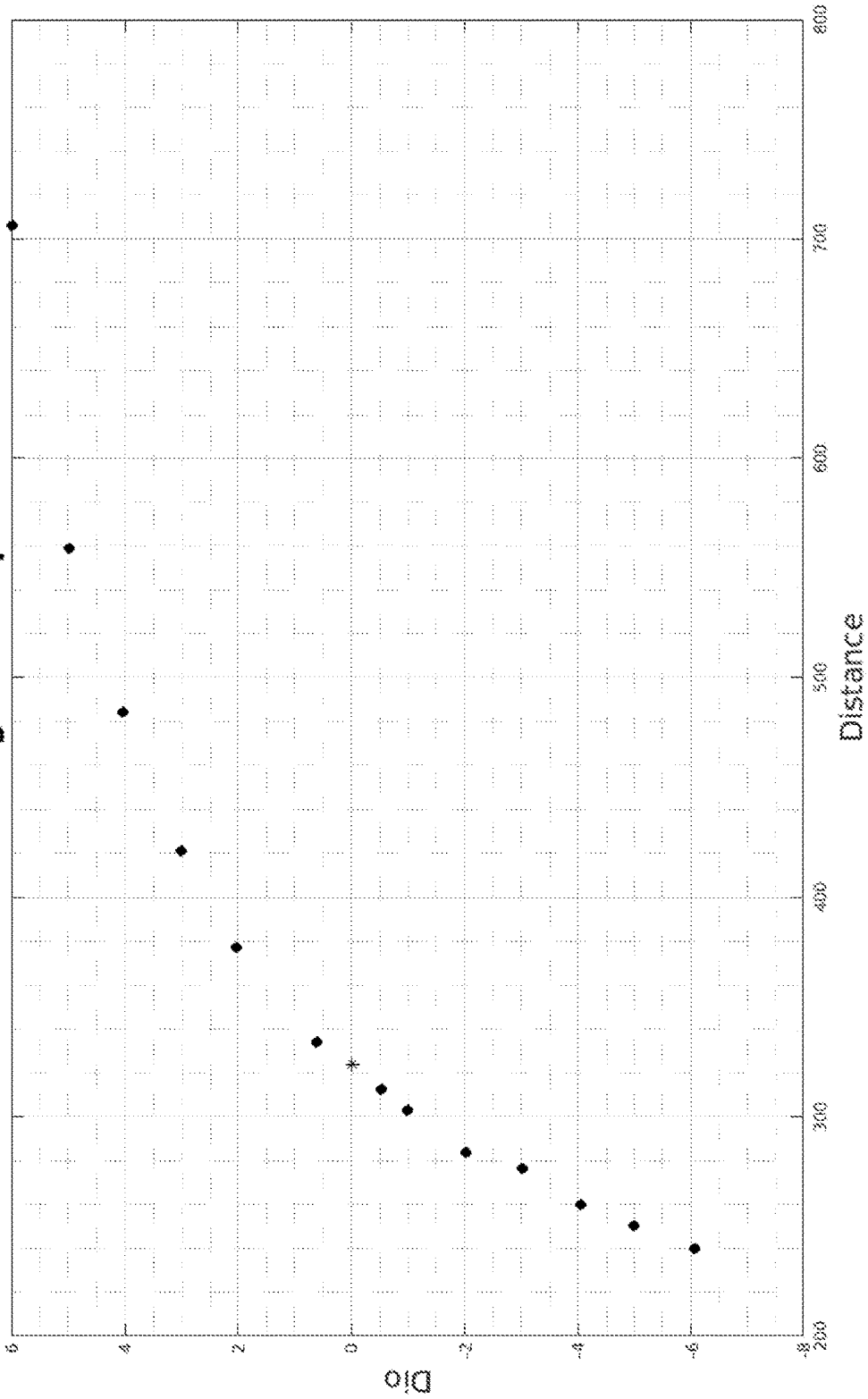
FIG. 5 is a schematic illustration of a graph depicting depth values versus spherical powers, in accordance with some demonstrative embodiments.

Reference is made to FIG. 5, which schematically illustrates a graph 500 depicting depth values versus spherical powers, in accordance with some demonstrative embodiments.

In one example, a depth value may include an average value of a depth map inside a spherical lens versus the lens spherical power, e.g., in Diopters.

As shown in FIG. 5, there may be a strong correlation between a spherical power of a lens and a depth value of the depth map of the lens.

Referring back to FIG. 1, in some demonstrative embodiments, application 160 may be configured to determine one or more optical parameters of a bi-focal lens, e.g., as described below.

In some demonstrative embodiments, application 160 may be configured to determine optical parameters of a bi-focal lens using a similar method to the spherical lens. For example, a bifocal lens may be handled as two different spherical lenses.

In some demonstrative embodiments, application 160 may be configured to determine one or more optical parameters of a multi-focal lens, e.g., as described below.

In some demonstrative embodiments, application 160 may be configured to determine optical parameters of a multifocal lens, for example, using a similar method to the spherical lens. For example, an analysis of a gradual depth changing along the ophthalmic lens may be performed, for example, based on a resolution of the depth map.

In some demonstrative embodiments, application 160 may be configured to process a depth map of a multifocal lens, e.g., as captured by depth mapper 118, which may include a set of D2 distances. In one example, a point in the set of distances, for example, each point in the set of distances, may sample the lens at a specific location, e.g., related to boundaries of the lens. In one example, application 160 may be configured to determine a set of powers P corresponding to the set of distances D2. For example, the set of distances D2 may be correlated to the set of powers P, which may create a topological power map of a design of the lens and/or optical centers of the lens.

In some demonstrative embodiments, application 160 may be configured to determine a far power and/or a near power, e.g., a far prescription and "addition", for example, based on the topological power map. In one example, the topological power map determine the design of the multifocal lens, including, for example, the primary powers of the lens, for example, a sphere, a cylinder, an axis, an addition, and/or a set of additional focal lengths, e.g., zones, and their location in the field of view, which may specify a "channel" for intermediate zones.

In some demonstrative embodiments, application 160 may be configured to determine optical parameters of the bi-focal and/or multifocal lens, for example, based on the method for spherical lens, e.g., as described above. For example, a bifocal lens may be represented by two different regular lenses, and/or a measurement of a multifocal lens may dependent on a resolution of depth mapper 118, for example, to analyze a gradual depth changing along the multifocal lens.

In some demonstrative embodiments, a magnification in the bifocal and/or multifocal lens may not be fixed over the ophthalmic lens. Therefore, calculation of the optical parameters may be expected to be localized, for example, opposite to spherical or cylindrical lenses, at which the magnification may be the same all over the ophthalmic lens, e.g., assuming the ophthalmic lens is unified.

In some demonstrative embodiments, a lens plane of a bifocal lens may be divided into two planes, where in each plane the ophthalmic lens calculation may be done separately, similar to the sphero-cylindrical uniform lens cases.

In some demonstrative embodiments, for example, a lens plane of a bifocal lens may change evenly along the ophthalmic lens. Therefore, a depth map of a multifocal lens may be expected to change evenly and/or continuously.

In some demonstrative embodiments, application 160 may determine a spherical power for a spherical-cylinder lens, for example, based on a cylinder of the lens, e.g., a-priori knowledge about the cylinder. For example, the cylinder may be the same for both areas, e.g., for a bifocal lens; and/or the cylinder may be the same along the corridor between near and far visions, e.g., for a general multifocal lens.

In some demonstrative embodiments, the depth map may include first depth information of a first area in the lens, and at least second depth information of at least a second area in the lens.

In some demonstrative embodiments, application 160 may be configured to determine optical parameters of a bi-focal lens or a multi-focal lens, for example, based on the first depth information and the second depth information, e.g., as described below.

In some demonstrative embodiments, application 160 may be configured to determine first optical parameters of the bi-focal lens or the multi-focal lens, for example, based on the first depth information, and/or to determine second optical parameters of the bi-focal lens or the multi-focal lens, for example, based on the second depth information, e.g., as described below.

In one example, calculation for a cylindrical axis and/or a cylindrical power of the bifocal and/or multifocal lens may be based on an assumption that a cylinder may be the same for all areas of the ophthalmic lens, e.g., for either bifocal or multifocal lens.

In another example, the depth mapping information may be applied with respect to a plurality of lens portions of a multifocal lens, which may have different spherical and/or cylindrical properties. For example, application 160 may be configured to process the depth map information from depth mapper 118 to identify portion-specific depth map information corresponding to a specific portion of the lens, and to determine the power and/or cylinder values for the specific lens portion based on the portion-specific depth map information corresponding to the specific portion of the lens. In one example, application 160 may be configured perform this portion-based processing of the depth map information in order to determine the optical parameters for a plurality of portions of the lens, for example, a "near" portion, an "intermediate" portion, a "far" portion and/or any other portion of the multifocal lens.

In some demonstrative embodiments, application 160 may be configured to instruct a user of device 102 to perform one or more operations, and/or to trigger, control and/or cause one or more elements of device 102 to perform one or more operations, for example, in order to assist application 160 in the process of determining one or more optical parameters of a spherical lens, a bifocal lens and/or a multifocal lens, e.g., as described below.

Figure 6:
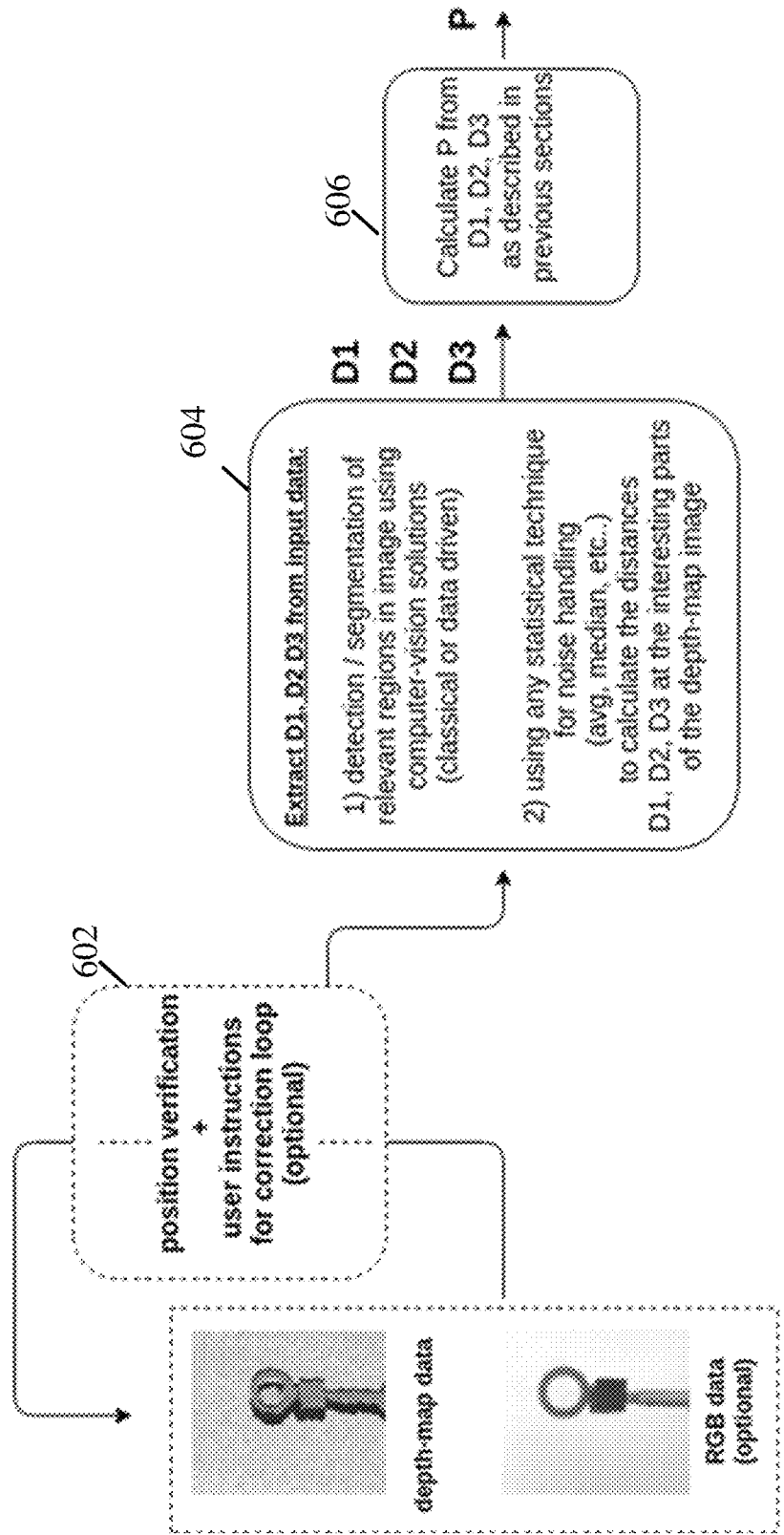
FIG. 6 is a schematic flow-chart illustration of a method of determining a spherical power of a lens, in accordance with some demonstrative embodiments.

Reference is made to FIG. 6, which schematically illustrates a method of determining one or more optical parameters of a spherical lens, in accordance with some demonstrative embodiments. For example, one or operations of the method of FIG. 6 may be performed by a system, e.g., system 100 (FIG. 1); a mobile device, e.g., device 102 (FIG. 1); a server, e.g., server 170 (FIG. 1); and/or an application, e.g., application 160 (FIG. 1).

In some demonstrative embodiments, as indicated at block 602, the method may include processing at least one depth map and, optionally, image information, for example, while instructing the user to position a lens and/or the depth sensor 118 (FIG. 1), e.g., as described above.

In some demonstrative embodiments, as indicated at block 604, the method may include determining the distances D1, D2, and/or D3, for example, based on segmentation of regions in the depth map, for example, using computer vision, e.g., classical or data driven; and/or based on statistical techniques, e.g., using an average, a median and/or the like, to be applied to the depth map, e.g., as described above.

In some demonstrative embodiments, as indicated at block 606, the method may include determining the spherical power P of the lens for example, based on the distances D1, D2, D3, for example, according to Equation 3, e.g., as described above.

Referring back to FIG. 1, in some demonstrative embodiments, application 160 may be configured to determine the spherical power of the lens, for example, based on an object captured via the lens, and a background object, e.g., as described below.

In some demonstrative embodiments, the background object may include, for example, a wall, a table, a floor, and/or the like.

In some demonstrative embodiments, application 160 may be configured to instruct a user of device 102 to hold device 102 including depth mapper 118, in front of the background object, e.g., a wall.

In one example, a featureless wall may be suitable for structured-light based systems.

In another example, a plane including a plurality of features, such as a checkerboard, or a display including a featured grid in a predefined frequency may be suitable for multiple and/or stereo camera based system.

In some demonstrative embodiments, application 160 may be configured to instruct the user of device 102 to place the device at the distance D1, e.g., of about 30 cm or any other distance, from the wall, for example, with assistance of depth mapper 118 and/or any other position and/or orientation sensor.

In some demonstrative embodiments, application 160 may be configured to segment an area of interest in the depth map, e.g., three areas or any other number of areas, for example, using one or more computer vision techniques, for example, to be used for determining the distances D1, D2, and/or D3.

In some demonstrative embodiments, the three areas may include an area outside the lens, e.g., the wall outside of the lens, an opaque rim of the lens, and an internal area of the lens.

In other embodiments, any other additional or alternative areas may be used.

In some demonstrative embodiments, the distance D1 may be used to guide the user to locate the depth mapper at a convenient distance D1*, for example, based on an accuracy criteria or any other criteria.

In one example, a particular value of the distance D1*, e.g., a "sweet spot", may be pre-calculated, and/or predefined, for example, based on a set of experiments, and may be set in application 160, e.g., as a hardcoded value.

In another example, a particular value of the distance D1* may be learned during a specific user process, for example, using computer vision techniques, e.g., to analyze objects and/or lens sizes in the depth map and/or captured RGB images.

In some demonstrative embodiments, application 160 may be configured to instruct the user of device 102 to place a lens at the distance D2 from depth mapper 118, e.g., at a mid-way between the wall and the device 102 or any other distance.

In some demonstrative embodiments, the distance D2 may be determined, for example, by assuming the lens is in the middle between the wall and the device 102, e.g., D2=0.5×D1=about 15 cm.

In one example, assuming D2=0.5×D1 may result in an inaccuracy proportional to the partial derivative of Equation 1, e.g., $$\frac{\partial P}{\partial D2}.$$

In some demonstrative embodiments, application 160 may be configured to instruct the user of device 102 to activate depth mapper 118 to capture depth map information via the lens, for example, when the lens is between device 102 and the background object.

In some demonstrative embodiments, application 160 may be configured to activate and/or cause depth mapper 118 to capture depth map information via the lens, for example, when the lens is between device 102 and the background object.

In some demonstrative embodiments, the distance D2 may be determined, for example, by depth mapper 118, e.g., from the opaque rim of the lens, a frame of the glasses, and/or based on any other reference object.

In some demonstrative embodiments, application 160 may be configured to determine the depth distance D3, for example, from the death map, e.g., by image processing segmentation methods, for example, to determine an area that corresponds to the ophthalmic lens in the depth map, e.g., within the opaque rim of the ophthalmic lens or the frame of the glasses.

In one example, for a bifocal or a multifocal lens, application 160 may be configured to determine the depth distance D3 twice, e.g., once for a far-zone of the lens, and once for a near-zone of the lens.

In some demonstrative embodiments, application 160 may be configured to determine the spherical power P of the ophthalmic lens, for example, based on the distances D1, D2, and D3, e.g., using Equations 1-3.

In some demonstrative embodiments, the spherical power P may be predicted from an empiric regression model, for example, using a precalculated correlation between the distances D1, D2, and D3 and the spherical power P, for example, using a regression-learning model.

In some demonstrative embodiments, application 160 may be configured to determine the spherical power of the lens, for example, based on a detected object, e.g., as described below.

In some demonstrative embodiments, the detected object may include, for example, a predefined shape on a display of a mobile phone, a tablet, a computer screen, or the like, a coin, a finger and/or any other object.

In one example, the detected object may include an object, which is detectable by common computer vision technique from input data modality available to the system, for example, by the depth mapper 118 and/or based on any other image and/or information captured by depth mapper 118, camera 119 and/or any other sensor of device 102.

In some demonstrative embodiments, application 160 may be configured to instruct the user of device 102 to hold device 102 including depth mapper 118, in front of the detected object, e.g., a coin.

In some demonstrative embodiments, application 160 may be configured to instruct the user of device 102 to place the device 102 at the distance D1* from the detected object, which is best suitable for the measurement, e.g., with assistance of depth mapper 118.

In one example, a particular value of the distance D1*, e.g., a "working distance", may be pre-calculated, and/or predefined, for example, based on a set of experiments, and may be set in application 160, e.g., as a hardcoded value.

In another example, a particular value of the distance D1* may be learned during a specific user process, for example, using computer vision techniques, e.g., to analyze objects and/or lens sizes in the depth map and/or captured RGB images.

In some demonstrative embodiments, application 160 may be configured to instruct the user of device 102 to keep the device in the same position, for example, to place the device static, e.g., to ensure the distance D1* does not change.

In some demonstrative embodiments, application 160 may be configured to instruct the user of device 102 to place a lens at the distance D2 from depth mapper 118, e.g., at a mid-way between the object and the device 102 or any other distance.

In some demonstrative embodiments, application 160 may be configured to determine the depth distance D3, for example, from the calibrated depth map, e.g., by image processing methods.

In some demonstrative embodiments, the distance D2 may be determined, for example, by assuming the lens is in the middle between the detected object and the device 102, e.g., D2=0.5×D1=about 15 cm.

In one example, assuming D2=0.5×D1 may result in an inaccuracy proportional to the partial derivative of Equation 1, e.g., In some demonstrative embodiments, application 160 may be configured to instruct the user of device 102 to activate depth mapper 118 to capture depth map information via the lens, for example, when the lens is between device 102 and the detected object.

In some demonstrative embodiments, application 160 may be configured to activate and/or cause depth mapper 118 to capture depth map information via the lens, for example, when the lens is between device 102 and the detected object.

In some demonstrative embodiments, the distance D2 may be determined, for example, by depth mapper 118, e.g., from an opaque rim of the lens, a frame of the glasses, and/or based on any other reference object.

In some demonstrative embodiments, application 160 may be configured to determine the spherical power P of the ophthalmic lens, for example, based on the distances D1, D2, and/or D3, e.g., using Equations 1-3.

In some demonstrative embodiments, the spherical power P may be predicted from an empiric regression model, for example, using a precalculated correlation between the distances D1, D2, and/or D3 and the spherical power P, for example, using a regression-learning model.

In some demonstrative embodiments, application 160 may be configured to determine the spherical power of the lens, for example, based on a detected object in a mirrored image, for example, when using a mirror, e.g., as described below.

In some demonstrative embodiments, application 160 may be configured to instruct the user of device 102 to hold the device 102 including depth mapper 118, for example, in front of a mirror.

In some demonstrative embodiments, the detectable object may include, for example, a displayed object, e.g., a predefined shape on a display of device 102, which may be reflected by the mirror.

In some demonstrative embodiments, application 160 may be configured to instruct the user of device 102 to place the device at the distance D2 from the mirror, which may be suitable for the measurement, e.g., with assistance of depth mapper 118.

In some demonstrative embodiments, application 160 may determine the spherical power of the lens, for example, based on some or all operations of described above, while using the distance D2 and using as the distance D1 a distance of the displayed object on the screen of device 102, as reflected by the mirror. For example, application 160 may determine the spherical power of the lens, for example, according to Equation 3, while setting the distance 1 to be twice the distance D2.

In some demonstrative embodiments, memory 194 may store a precalculated mapping between the spherical power P, and the distances D1, D2, and D3, for example, based on empirical results. For example, application 160 may be configured to accumulate measurements between the distances D1, D2, and D3 and the spherical power P, and to determine the precalculated mapping, for example, based on the accumulated measurements. For example, application 160 may access the precalculated mapping information in memory 194 to determine and the spherical power P corresponding to a measured depth map captured via the lens.

In some demonstrative embodiments, depth mapper 118 may include a structured-light depth sensor, e.g., a structured-light stereo-camera sensor.

In some demonstrative embodiments, application 160 may be configured to determine one or more parameters of the lens by processing the depth information from depth mapper 118 as a structured-light depth measurement performed by the structured-light depth sensor.

In some demonstrative embodiments, a first component of depth mapper 118 may not be "looking" via the lens while a second component of depth mapper 118 may be "looking" via the lens.

In some demonstrative embodiments, a camera structured-light depth mapper 118 may not be "looking" via the lens, for example, when depth mapper 118 includes a structured-light depth sensor.

In one example, as the distances D1 and D2 may increase, an assumption that both of the cameras are 'looking" via the lens may not be correct.

In one example, an experiment shows that at a larger distance both components of depth mapper 118 may not look through the tested lens for some of the field points, and increasing the distance more, may cause this to happen for all field points.

In another example, at very large distances, no beam will be able to go through the lens and back to the sensor.

Figure 7:
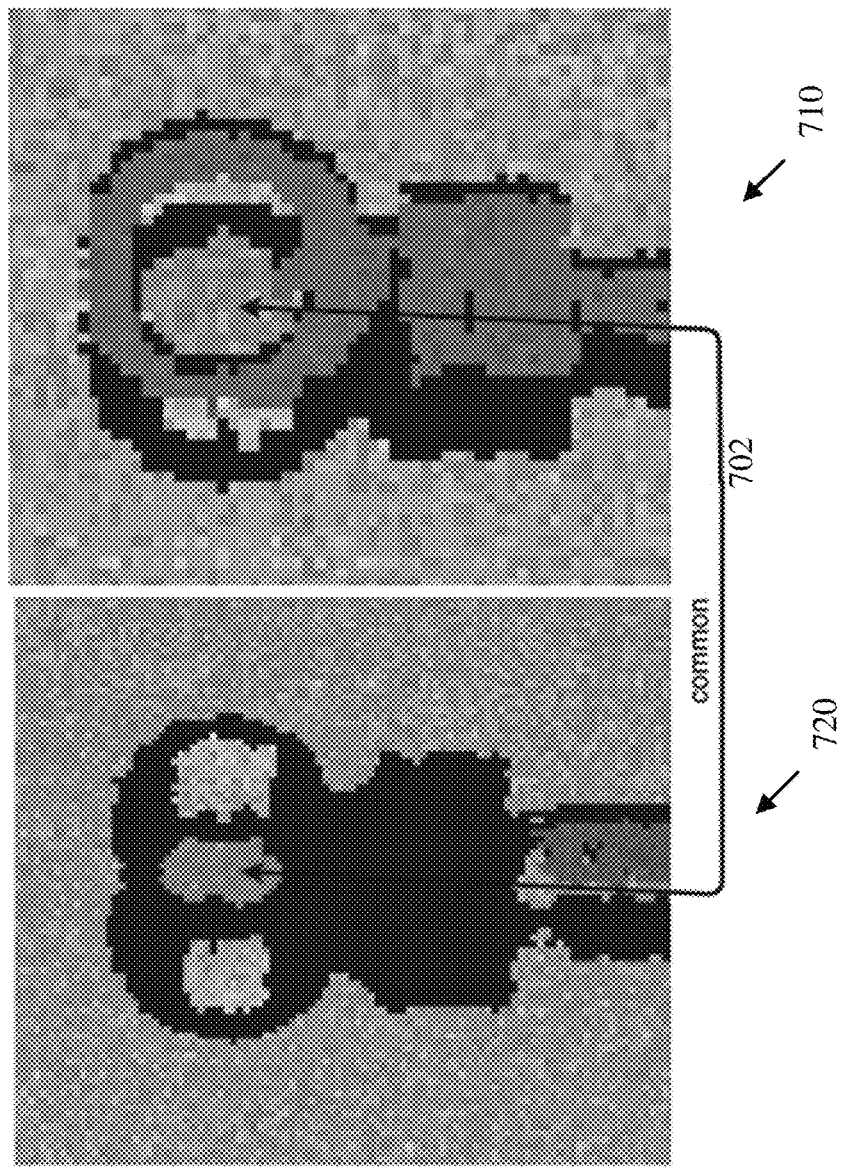
FIG. 7 is a schematic illustration of a first depth map of a lens, and a second depth map of the lens, in accordance with some demonstrative embodiments.

Reference is made to FIG. 7, which schematically illustrates a first depth map 710 of a lens and a second depth map 720 of the lens, in accordance with some demonstrative embodiments.

In one example, depth maps 710 and 720 may be captured by a structured-light depth sensor.

In some demonstrative embodiments, as shown in FIG. 7, a common area 702 may include a central area in which both parts of the depth sensor may be looking through.

In some demonstrative embodiments, depth map 710 may be captured at a first distance D2, and depth map 720 may be captured at a second distance D2, greater than the first distance.

In some demonstrative embodiments, as shown in FIG. 7, the common area 702 may increase as the distance D2 decreases.

In some demonstrative embodiments, application 160 (FIG. 1) may be configured to instruct the user of device 102 (FIG. 1) to locate the lens, device 102, and/or the reference object, at suitable distances, for example, to achieve a larger common area 702, e.g., as described below.

In one example, calculations for the areas around common area 702 may be different, for example, as introduction of the lens may scale and/or shift a feature field across an object, e.g., a wall.

Figure 8:
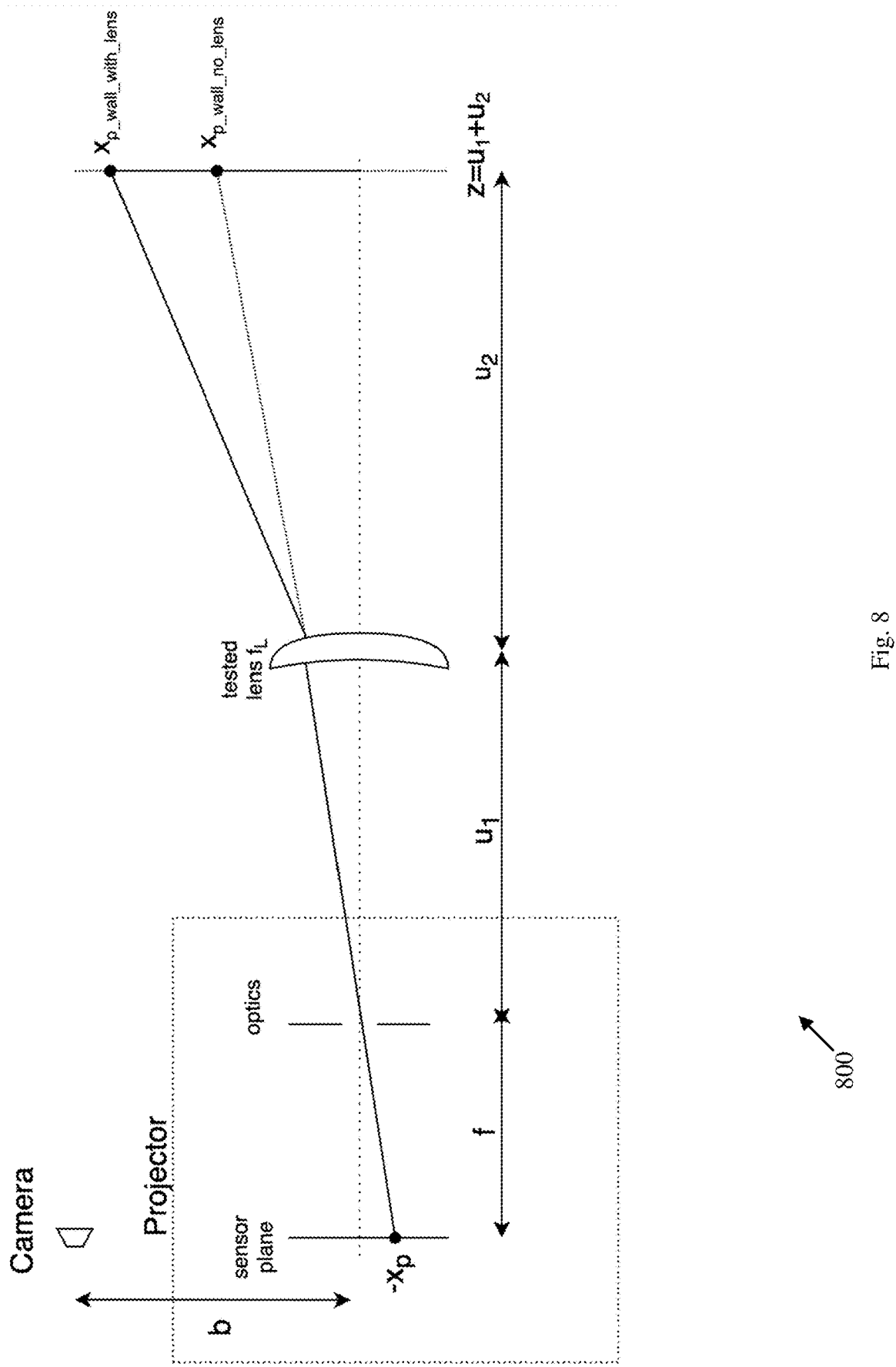
FIG. 8 is a schematic illustration of a measurement scheme, in accordance with some demonstrative embodiments.

Reference is made to FIG. 8, which schematically illustrates a measurement scheme 800, in accordance with some demonstrative embodiments.

In one example, measurement scheme 800 may include a reference object, e.g., the planar object, and a depth mapper 118 (FIG. 1) to capture a depth map via a tested lens. For example, the depth mapper may include a structured-light configuration, for example, when an observing camera is not "looking" through a tested lens; or a stereo camera configuration, for example, when an observing camera is not "looking" through the tested lens.

In one example, introduction of a tested lens, e.g., between the depth mapper 118 (FIG. 1) and the planar object, may scale the feature field across the reference object, e.g., as described below.

In one example, as shown in FIG. 8, one or more features may be projected, e.g., by a structured light projector of depth mapper 118 (FIG. 1), via the tested lens onto a projection plane, and captured by a camera, e.g., a camera of the depth mapper 118 (FIG. 1), which is not "looking" through the tested lens.

In another example, one or more features may be captured, e.g., by a first camera of a stereo-camera depth mapper 118 (FIG. 1), via the tested lens on the projection plane, and captured by a second camera, e.g., a second camera of the stereo-camera depth mapper 118 (FIG. 1), which is not "looking" through the tested lens.

In some demonstrative embodiments, location of a feature, e.g., each feature, for a spherical lens, may be determined, e.g., as follows:

$$x_{p\_wall\_with\_lens} = \tan(x_p/f)*(u_2-(u1-f)*(u_2/f_L-1)) - x_p*(u_2/f_L-1)$$

$$x_{p\_wall\_no\_lens} = \tan(x_p/f)*(u_1+u_2-f) \quad (4)$$

In some demonstrative embodiments, as shown in FIG. 8, the introduction of the lens may affect the size and/or location of the one or more features.

In some demonstrative embodiments, application 160 (FIG. 1) may determine a depth of a feature, for example, based on a change in a size of the feature in the depth map, e.g., as described below.

In one example, a power of the lens, denoted $f_L$, may be determined, for example, based on a depth of a feature, for example, as the depth of the feature may not be related to the feature size.

For example, an assumed depth, denoted $z_f$, may be based on a captured feature size, denoted $sze_f$, e.g., as follows:

$$z_f = k_1 * sze_f + k_2 \quad (5)$$

In one example, when the features are projected through the tested lens, the features may be changed in size and/or may become orientation dependent, therefore a lens depth, denoted zf', of the features through the lens may be determined, e.g., as follows:

$$z_f' = k_1 * sze_f' + k_2 \quad (6)$$

wherein $sze_f'$ may be a function of the spherical power $f_L$ and an orientation.

For example, several depth maps for several lens angles for a non-spherical lens may be used, for example, to determine one or more optical parameters of a cylindrical lens.

In some demonstrative embodiments, the tested lens may be placed in close proximity to depth mapper 118 (FIG. 1), for example, by placing the lens on depth mapper 118 (FIG. 1), e.g., to capture the depth map via the tested lens, e.g., as described below.

In some demonstrative embodiments, the distance between the tested lens and depth mapper 118 (FIG. 1), e.g., the distance $u_1$ may be set to zero, e.g., $u_1=0$, for example, when the tested lens is placed in close proximity to depth mapper 118 (FIG. 1).

In some demonstrative embodiments, application 160 (FIG. 1) may determine the location of the feature, e.g., according to Equations 4, for example, when the value of $u_1$ is set to zero.

In some demonstrative embodiments, the depth of the feature may be determined, for example, based on a change in a location of the feature, for example, a feature shift, e.g., as described below.

Figure 9:
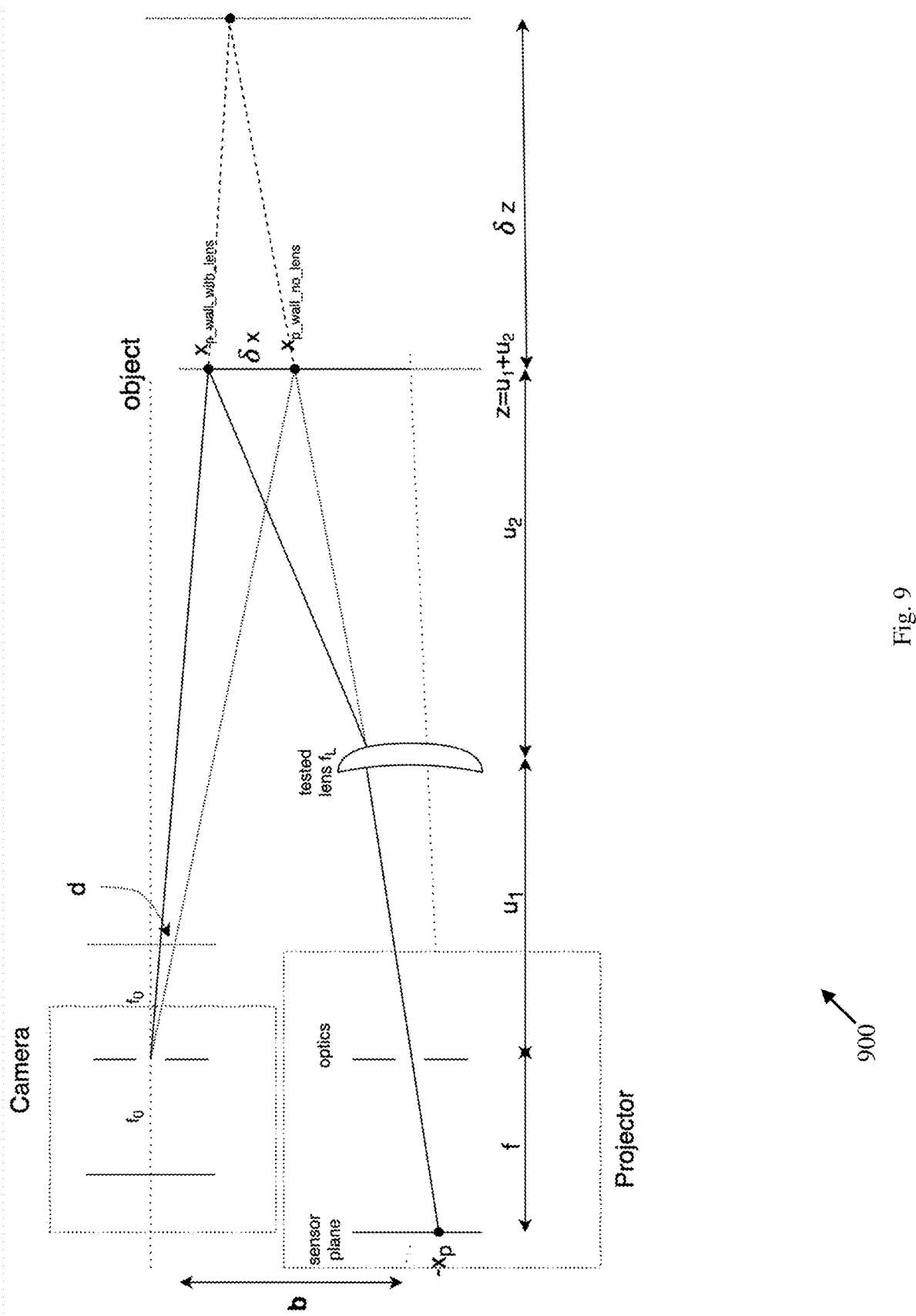
FIG. 9 is a schematic illustration of a measurement scheme, in accordance with some demonstrative embodiments.

Reference is made to FIG. 9, which schematically illustrates a measurement scheme 900, in accordance with some demonstrative embodiments.

In one example, measurement scheme 900 may include a reference object, e.g., the planar object, and a depth mapper 118 (FIG. 1) to capture a depth map via a tested lens. For example, the depth mapper may include a structured light configuration, for example, when an observing camera is not "looking" through a tested lens; or a stereo camera configuration, for example, when an observing camera is not "looking" through the tested lens.

In one example, introduction of a tested lens, e.g., between the depth mapper 118 (FIG. 1) and the planar object, may scale the feature field across the reference object, e.g., as described below.

In one example, as shown in FIG. 9, one or more features may be projected, e.g., by a structured light projector of depth mapper 118 (FIG. 1), via the tested lens onto a projection plane, and captured by a camera, e.g., a camera of the depth mapper 118 (FIG. 1), which is not "looking" through the tested lens.

In another example, one or more features may be captured, e.g., by a first camera of a stereo-camera depth mapper 118 (FIG. 1), via the tested lens on the projection plane, and captured by a second camera, e.g., a second camera of the stereo-camera depth mapper 118 (FIG. 1), which is not "looking" through the tested lens.

In some demonstrative embodiments, as shown in FIG. 9, the introduction of the lens may affect the size and/or location of the one or more features.

In some demonstrative embodiments, application 160 (FIG. 1) may determine a depth of a feature, for example, based on a change in a location of the feature, for example, a feature shift, e.g., as described below.

In some demonstrative embodiments, a feature shift may be defined as a difference between a location of the feature with the lens and a location of the feature without lens, for example, based on Equations 4, e.g., as follows $$\text{Feature shift} = \delta x = x_{p\_wall\_with\_lens} - x_{p\_wall\_no\_lens} = \tan(x_p/f)*(u_2-(u_1-f)*(u_2/f_L-1)) - xp*(u_2/f_L-1) - \tan(x_p/f)*(u_1+u_2-f) \quad (7)$$

In some demonstrative embodiments, as shown in FIG. 8, the feature shift may result in a disparity change.

In some demonstrative embodiments, a relationship between a reported depth, e.g., from depth sensor 118 (FIG. 1), and a disparity may be determined, e.g., as follows:

$$1/(z+\delta z) = 1/z_{ref} + d_1)/(bf_0)$$

$$1/z = 1/z_{ref} + d_2/(bf_0) \quad (8)$$

wherein d1 denotes a measured disparity with the tested lens for a p-th feature, and d2 denotes a measured disparity without the tested lens for the p-th feature.

In some demonstrative embodiments, the following relationship may be determined, for example, according to Equation 8:

$$(d_1-d_2)/\delta x = f/z \quad (9)$$

wherein $\delta_x$ denotes a power of the lens.

Referring back to FIG. 1, in some demonstrative embodiments, depth mapper 118 may include a ToF depth mapper.

In some demonstrative embodiments, application 160 may be configured to determine one or more parameters of the lens by processing the depth information, e.g., from depth mapper 118, as depth information of a ToF depth measurement.

In one example, a ToF depth mapping technique may be based on a time-of-flight principle and/or on a disparity of a point captured at or projected from different coordinates in the real world.

In some demonstrative embodiments, the ToF depth measurement may include a phase shift/time delay, which may be transformed to a distance measurement, for example, under a free space assumption.

In some demonstrative embodiments, an object point may be illuminated by a modulated optical signal, and imaged to a sensor plane, for example, using ToF optics.

In some demonstrative embodiments, contributing rays, e.g., except for stray light, for a given pixel may travel about the same optical distance, which may be an imaging condition.

In some demonstrative embodiments, an introduction of a tested lens may result in a change in an optical distance for the contributing rays, e.g., there will be a different set of rays leaving the object point. In case that an illumination path may pass through a tested lens as well, then an overall path difference, e.g., from a lensless scenario, may have two contribution rays, and, as a result, a depth reading may change.

In some demonstrative embodiments, application 160 may be configured to determine a power of a tested lens, for example, based on the amount of change of the ToF measurement, and one or more configuration parameters of the ToF measurement.

In some demonstrative embodiments, the tested lens may be spherical, sphero-cylindrical/torical or cylindrical, for example, as the lens deflects the beamlets/rays according to its curvature, e.g., through refraction or reflection.

Figure 10:
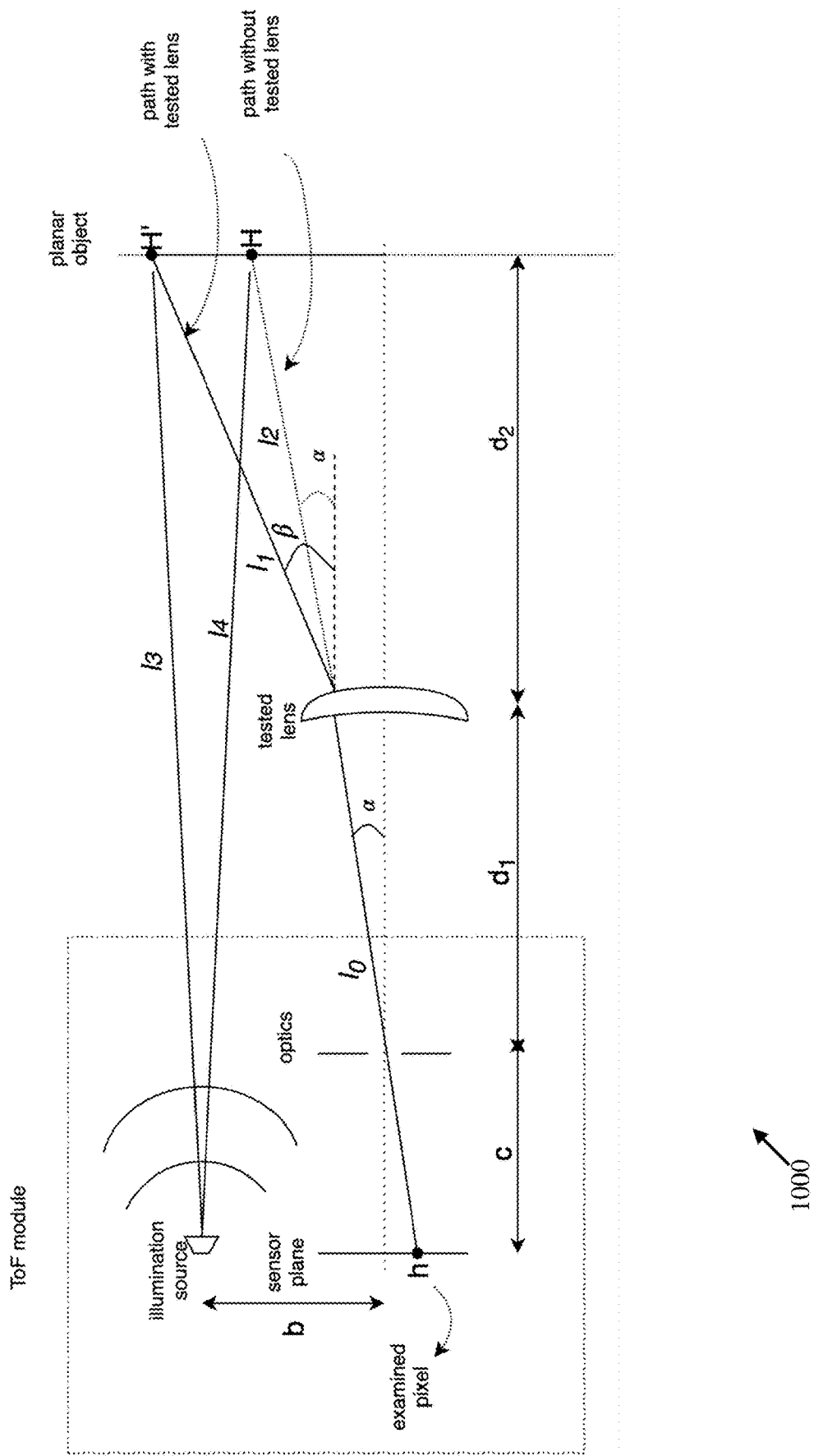
FIG. 10 is a schematic illustration of a measurement scheme, in accordance with some demonstrative embodiments.

Reference is made to FIG. 10, which schematically illustrates a measurement scheme 1000, in accordance with some demonstrative embodiments.

In one example, measurement scheme 1000 may include a reference object, e.g., a planar object, and a depth mapper 118 (FIG. 1) to capture a depth map via a tested lens. For example, the depth mapper 118 (FIG. 1) may include a ToF depth mapper, for example, where a ray from an illumination source of the ToF depth mapper may not "pass" through the tested lens.

In some demonstrative embodiments, the tested lens may include two crossed cylindrical lenses, each deflecting light according to its power across the major meridian.

In one example, introduction of a tested lens, e.g., between the depth mapper 118 (FIG. 1) and the planar object, may change a path of one or more contribution rays of the ToF measurement.

In some demonstrative embodiments, there may be a path difference, denoted Δpath, for example, between a first path of light, denoted $path_{NOLENS}$, and a second path of light, denoted $path_{LENS}$. For example, the first path $path_{NOLENS}$ may be from the ToF component to a first pixel coordinate, denoted H, without passing through the tested lens; and the second path $path_{LENS}$ may be from the ToF depth mapper, to a second pixel coordinate, denoted H', when passing through the tested lens.

In some demonstrative embodiments, application 160 may be configured to determine the path difference Δpath, e.g., as follows:

$path_{NO\_LENS} = l_0 + l_1 + l_3$ $path_{WITH\_LENS} = l_0 + l_2 + l_4$ $l_4 = l_0 + l_2$ $l^2_3 = l^2_4 + d_2^2 \cdot (\tan(\beta) - \tan(\alpha))^2 - 2 \cdot l_4 \cdot d_2 \cdot (\tan(\beta)\tan(\alpha))$ $l_2 = d_2 / \cos(\alpha)$ $l_1 = d_2 / \cos(\beta)$ $\Delta_{path} = path_{WITH\_LENS} - path_{NO\_LENS} = l_2 + l_4 - l_1 - l_3$ \hfill (10)

In some demonstrative embodiments, the path difference Δpath may be related to the power of the tested lens, for example, as the depth sensor may measure a value directly related to an optical path.

Figure 11:
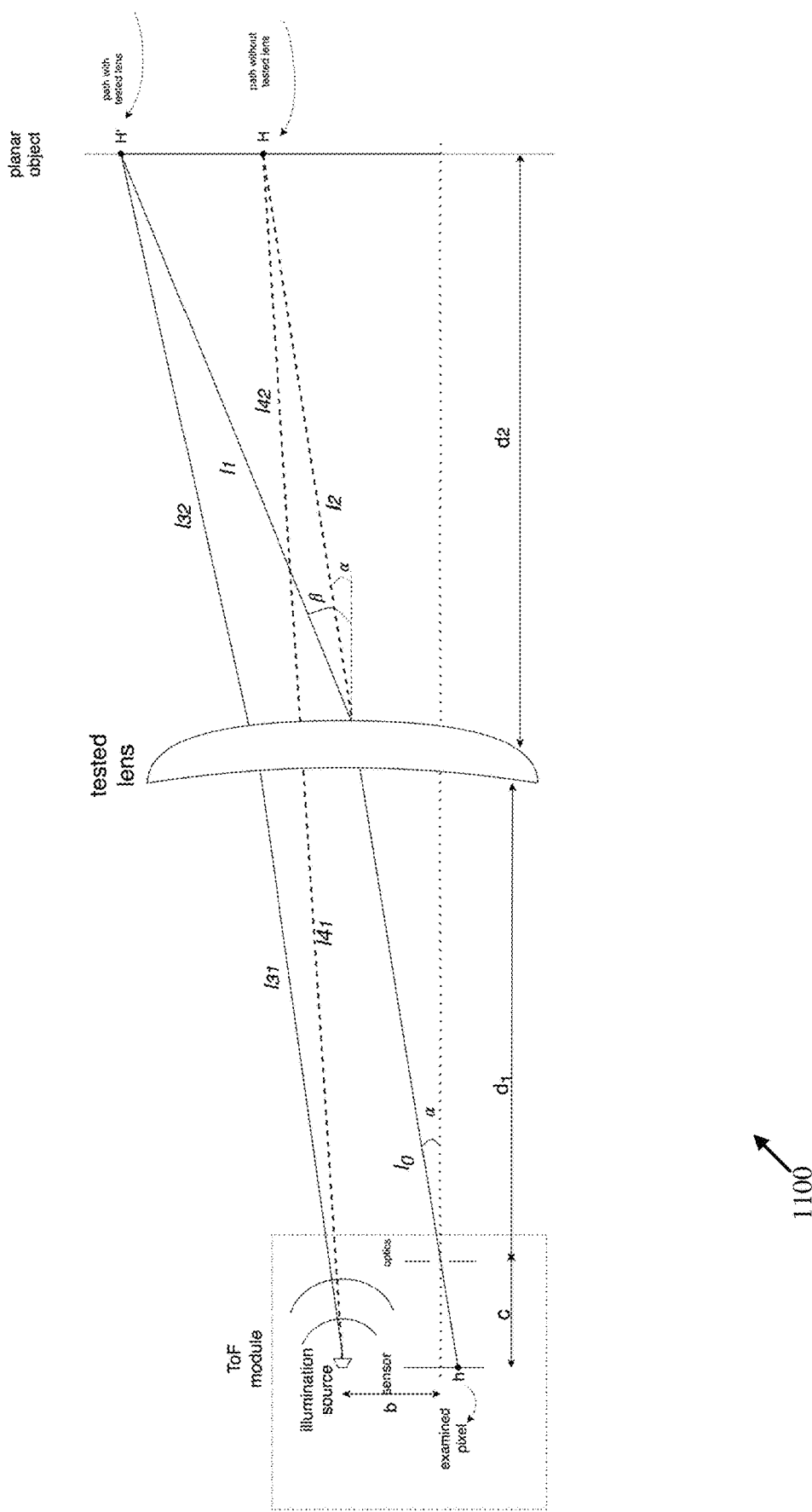
FIG. 11 is a schematic illustration of a measurement scheme, in accordance with some demonstrative embodiments.

Reference is made to FIG. 11, which schematically illustrates a measurement scheme 1100, in accordance with some demonstrative embodiments.

In one example, measurement scheme 1100 may include a reference object, e.g., a planar object, and a depth mapper 118 (FIG. 1) to capture a depth map via a tested lens. For example, the depth mapper may include a ToF depth mapper, for example, where rays of an illumination source of the ToF depth mapper may "pass" through the tested lens.

In some demonstrative embodiments, the tested lens may include two crossed cylindrical lenses, each deflecting light according to its power across the major meridian.

In one example, introduction of a tested lens, e.g., between the depth mapper 118 (FIG. 1) and the planar object, may change a path of one or more contribution rays from the illumination source.

In some demonstrative embodiments, there may be a path difference, denoted Δpath, for example, between a first path of light, denoted $IlluminationPath_{WithoutLens}$, and a second path of light, denoted $IlluminationPath_{WithLens}$. For example, the first path $IlluminationPath_{WithoutLens}$ may be from the ToF depth mapper to a first pixel coordinate, denoted H, without passing through the tested lens; and the second path $IlluminationPath_{WithLens}$ may be from the ToF depth mapper, to a second pixel coordinate, denoted H', when passing through the tested lens.

In some demonstrative embodiments, application 160 may be configured to determine the path difference Δpath, e.g., as follows:

$IlluminationPath_{WithLens} = l_{31} + l_{32}$ $ImagingPath_{WithLens} = l_1 + l_0$ $IlluminationPath_{WithoutLens} = l_{41} + l_{42}$ $ImagingPath_{WithoutLens} = l_2 + l_0$ $\Delta path = \Delta path_{Illumination} + \Delta path_{Imaging}$ \hfill (11)

In some demonstrative embodiments, the path difference Δpath may be related to the power of the tested lens, for example, as the depth sensor may measure a value directly related to a difference in sensor depth reading.

In some demonstrative embodiments, in another configuration, light may be reflected from the front surface of the lens, and may reach the depth sensor. The rays may be treated in a similar manner to the manner described above, and a path difference may be determined in a similar manner.

Referring back to FIG. 1, in some demonstrative embodiments, application 160 may be configured to determine the optical center of the lens, e.g., as described below.

In some demonstrative embodiments, application 160 may be configured, for example, to identify the optical center, for example, with respect to lens boundaries of the lens. In one example, a frame of eyeglasses including the lens may serve as reference points for identifying the center of the lens. For example, application 160 may determine a displacement of the optical center from the reference points, for example, based on transverse distance information from depth mapper 118.

In one example, the optical center may be characterized by the fact that a beamlet passing through it may not be deflected. For example, no deflection may mean a same depth measurement. Accordingly, identifying a field associated with a particular point of the lens, in which a depth measurement passing through the lens is equal to a depth measurement of the lensless case, may provide information on where the optical center is located.

In some demonstrative embodiments, application 160 may be configured to determine the optical center, for example, by identifying a location, e.g., relative to a reference point, of a depth measurement value captured via the lens and having a same value, for example, as a depth value at the same location captured not via the lens.

In some demonstrative embodiments, application 160 may be configured to determine a Pupillary Distance (PD) of eyeglasses, for example, based on optical centers of lenses of the eyeglasses, e.g., as described below.

In some demonstrative embodiments, application 160 may be configured to identify the locations of the optical centers of two lenses of the eyeglasses, and to determine the PD of the eyeglasses based on the identified locations of the optical centers of lenses of the eyeglasses, e.g., as described below.

In some demonstrative embodiments, application 160 may be configured to determine the distance between the optical centers of the two lenses, for example, based on depth information from depth sensor 118. In one example, application 160 may be configured to utilize depth information from the depth sensor 118 in the form of three-dimensional (3D) information, e.g., including information regarding the orientation and size of the eyeglasses, which may be utilized to determine relative locations of the two optical centers.

In some demonstrative embodiments, application 160 may be configured to utilize the 3D information including the orientation and size of the eyeglasses, for example, to refine depth values of depth information from depth mapper 118, e.g., which is to be used for determining the one or more parameters if the lens.

In some demonstrative embodiments, application 160 may be configured to determine a plane of the eyeglasses, for example, based on the depth information corresponding to the eyeglasses.

In some demonstrative embodiments, application 160 may be configured to determine the distance between the two optical centers based on any other additional or alternative information and/or procedure. In one example, application 160 may be configured to determine the distance between the two optical centers based on calibration and/or calculations, for example, by comparing an image of a known scale object to an image of the eyeglasses, e.g., as captured by camera 119 and/or any other camera.

In some demonstrative embodiments, the tested lens may include a cylindrical lens, and application 160 may be configured to determine one or more optical parameters of the cylindrical lens, e.g., as described below.

In one example, when depth mapper 118 includes a structured-light stereo camera, a deflection direction of the beamlets refracted by the cylindrical lens may be important. For example, a lens power along a meridian in the direction of the cameras or IR source-sensor displacement vector may "disappear", e.g., as described below According to this example, measurement of cylindrical lenses may utilize several depth map images, for example, rotated in different angles, e.g., as described below.

In another example, measurement of cylindrical lenses may utilize the solution for sphero-cylindrical lenses, e.g., as described above.

In some demonstrative embodiments, application 160 may be configured determine one or more, e.g., some or all, of a spherical power, a cylindrical power and a cylindrical axis, of the cylindrical lens, e.g., as described below.

In some demonstrative embodiments, application 160 may be configured to determine one or more optical parameters of the cylindrical lens, for example, based on a plurality of depth maps corresponding to a plurality of lens angels of the lens, e.g., as described below.

In some demonstrative embodiments, a depth map of the plurality of depth maps may correspond to a lens rotation of the lens, e.g., at a different angle.

In some demonstrative embodiments, the lens rotation may include a relative rotation between the lens and device 102.

In one example, a lens rotation of the ophthalmic lens may be performed, for example, by rotating the lens, e.g., while maintaining device 102 at a static position.

In another example, the lens rotation of the lens may be performed, for example, by rotating device 102, e.g., while maintaining the lens static. According to this example, the lens rotation may be determined, for example, based on an orientation sensor of device 102, e.g., a gyroscope, and/or any other sensor.

In another example, the lens rotation of the lens may be performed, for example, by rotating both the lens and device 102.

In one example, when depth mapper 118 includes a stereo camera, dual camera or the like, a direction of light-beams refracted by the lens may be based on a cylindrical power and a cylindrical axis of the cylindrical lens. For example, the cylindrical power of the lens along a meridian in direction of the stereo-camera or IR source-sensor of depth mapper 118 may "disappear", e.g., as described below.

According to this example, a plurality of depth maps rotated in different angles may be used to estimate, e.g., correctly, the cylindrical axis of the cylindrical lens.

In some demonstrative embodiments, application 160 may be configured to determine the cylindrical power and/or the cylindrical axis of the lens, for example, based on precalculated depth map information and/or any other method and/or algorithm.

In one example, a sphero-cylindrical lens may include a lens with a major aberration, e.g., as described by Zernike second order terms.

In some demonstrative embodiments, application 160 may be configured to determine sphere powers across two major lens meridians, and the axis of the two major lens meridians, e.g., in a world reference frame. For example, in spectacles lenses measurement of the axis may be relative to a frame horizontal line, and the optical parameters may include a sphere, a cylinder and an axis.

Figure 12:
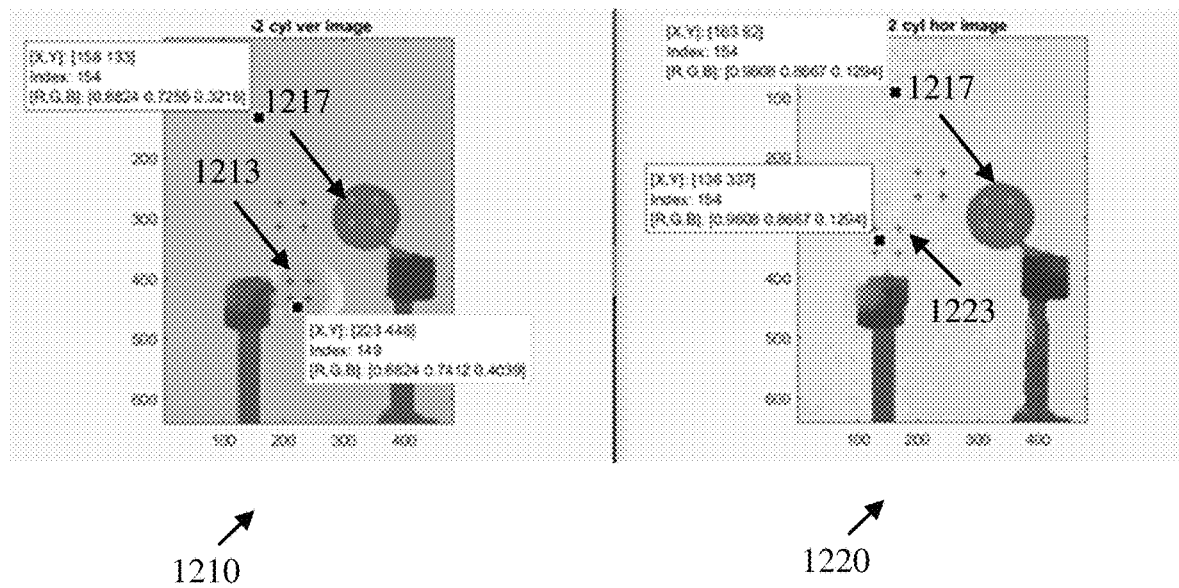
FIG. 12 is a schematic illustration of a first depth map of a cylindrical lens at a first angle, and a second depth map of the cylindrical lens rotated at a second angle, in accordance with some demonstrative embodiments.

Reference is made to FIG. 12, which schematically illustrates a first depth map 1210 of a cylindrical lens at a first angle, and a second depth map 1220 of the cylindrical lens rotated at a second angle, in accordance with some demonstrative embodiments.

In one example, depth maps 1210 and 1220 may be captured using measurement system 300 (FIG. 3), for example, when lens 315 (FIG. 3) includes a cylindrical lens.

In one example, depth map 1210 may be captured when the cylindrical lens is rotated, such that a cylindrical axis of the lens is vertical.

In one example, depth map 1220 may be captured when the cylindrical lens is rotated, such that a cylindrical axis of the lens is horizontal.

As shown in FIG. 12, depth information 1213 via the cylindrical lens, e.g., when the cylindrical axis is vertical, is different from depth information 1223 via the cylindrical lens, e.g., when the cylindrical axis is horizontal, for example, while depth information in depth maps 1210 and/or 1220 may be the same for an opaque objects 1217, e.g., object 317 (FIG. 3), and the wall, e.g., at areas captured not via the lens. For example, according to depth information 1223, the lens may seem to "disappear".

Referring back to FIG. 1, in some demonstrative embodiments, application 160 may be configured to determine a full prescription of a cylindrical lens, e.g., including a sphere, a cylinder and/or an axis of the cylindrical lens, for example, by repeating the process for the cylindrical lens, e.g., as described above, while the lens or depth mapper 118 are, e.g., rotated in a plane of the lens. In one example, a stereovision depth map for magnification calculation may have a limitation of an induced axis system.

In some demonstrative embodiments, application 160 may be configured to evaluate a magnification at a lens meridian, and match the results to an ellipse, which may define the sphere, cylinder and/or an axis of the cylindrical lens.

In one example, 5 different lens angles may be suitable, e.g., theoretically, to accurately define the ellipse, for example, to get the full prescription of the cylindrical lens.

In another example, more than 5 different lens angles may be used, for example, to increase an accuracy of the prescription.

In some demonstrative embodiments, application 160 may be configured to determine the full prescription of the cylindrical lens, for example, even without rotation of the lens, e.g., as described below.

In some demonstrative embodiments, device 102 may include a plurality of depth mappers 118, e.g., distinct or obtained using optically aided division of a single sensor through spatial multiplexing.

In some demonstrative embodiments, the plurality of depth mappers 118 may provide depth information corresponding to a plurality of orientations or meridians of the lens, such that a captured depth map of a depth mapper may correspond to a different lens effect, e.g., a different angle/meridian.

In some demonstrative embodiments, application 160 may be configured to perform one or more calculations, for example, to determine the one or more parameters of the lens, for example, based on a plurality of meridian measurements, for example, using a set of equations each having an unknown parameter, e.g. a power along the meridian.

Figure 13:
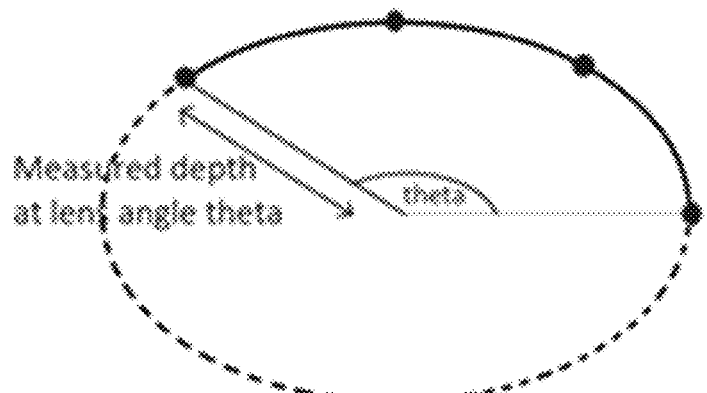
FIG. 13 is a schematic illustration of an ellipse of lens angles, in accordance with some demonstrative embodiments.

Reference is made to FIG. 13, which schematically illustrates an ellipse 1300 of lens angles, in accordance with some demonstrative embodiments.

As shown in FIG. 13, five different lens angles may be suitable to accurately define the ellipse 1300, for example, to get the full prescription of a cylindrical lens.

In some demonstrative embodiments, application 160 may be configured to determine a prescription, e.g., a partial or full prescription, of a cylindrical lens, e.g., including a sphere, a cylinder and/or an axis of the cylindrical lens, for example, by analyzing two or more meridians of the cylindrical lens, for example, even without rotating the lens and/or device 102, e.g., as described below.

In one example, a light of an IR emitter of depth mapper 118 may be split and projected at different angles, for example, into two or more meridians, for example, via a beam splitter and/or through different prisms, for example, to analyze two or more meridians, e.g., simultaneously. According to this example, application 160 may determine an entire prescription of the lens, for example, even without rotating device 102 and/or the lens.

In some demonstrative embodiments, a relative angle of the lens with respect to at least one predefined axis, e.g., when the depth map is captured by depth mapper 118, may affect the one or more optical parameters of the lens, for example, at least a nominal lens power of the lens, e.g., as described below.

In one example, the predefined axis may include an axis perpendicular to an optical axis of depth mapper 118. For example, the optical axis of depth mapper 118 may include an axis according to which and/or relative to which depth mapper 118 provides the depth map.

In some demonstrative embodiments, the relative angle of the lens may be changed, for example, when changing an orientation of device 102 and/or an orientation of the lens.

In some demonstrative embodiments, application 160 may be configured to perform one or more operations and/or to instruct a user to perform one or more operations, for example, to allow application 160 to take into consideration the effect of the relative angle of the lens, e.g., as described below.

In some demonstrative embodiments, application 160 may be configured to instruct the user to tilt the lens or glasses including the lens to a plurality of lens tilts along the predefined axis, and to capture a plurality of depth maps at the plurality of lens tilts.

In some demonstrative embodiments, application 160 may be configured to derive the nominal lens power of the lens, for example, based on information from the plurality of depth maps.

In some demonstrative embodiments, application 160 may be configured to determine the relative angle of the lens, and to determine the one or more optical parameters of the lens, for example, based on the relative angle of the lens when the depth map is captured, e.g., as described below.

In some demonstrative embodiments, application 160 may be configured to estimate the relative angle between the lens and the depth sensor axis, e.g., when the depth map is captured, for example, via occluding features of a frame holding the lens, e.g., as described below.

In one example, geometrical information may be derived from a visible sensor, e.g., of between 400-700 nanometers (nm) or any other wavelength sensor, which may be used to estimate the lenses and/or glasses transformation, e.g., a change in perspective of the glasses, assuming a symmetry of the glasses. For example, a right part of the glasses may be larger than a left part of the glasses, e.g., based on the relative angle of the lens and/or glasses with respect to the predefined axis.

In another example, a depth map of the occluding features may be used, for example, to estimate a frame angle compared to the depth sensor axis. For example, a set of a few distance information pixels across the frame may be used, for example, to describe a complete frame orientation.

In some demonstrative embodiments, application 160 may be configured to determine the one or more parameters of the lens, for example, based on a determined relative angle, denoted θ, between the lens and the predefined axis, for example, when the depth map is captured by the depth mapper 118, e.g., as described below.

In some demonstrative embodiments, application 160 may determine a power correction, denoted $F_{NEWSPH}$, to correct an estimated spherical power, denoted $F_{SPH}$, for example, based on the relative angle θ, e.g., as follows:

$$F_{NEWSPH} = \left(1 + \frac{\sin^2\theta}{2n}\right) F_{SPH} \qquad (12)$$

In some demonstrative embodiments, application 160 may be configured to determine a cylinder correction, denoted $C_{INDCYL}$, to correct an estimated cylindrical power, for example, based on the relative angle θ and the power correction, e.g., as follows:

$$C_{INDCYL} = F_{NEWSPH} \cdot \tan^2 \theta \qquad (13)$$

In some demonstrative embodiments, application 160 may be configured to determine an index of refraction (n) of the lens, for example, based on a plurality of images captured at a plurality of lens rotations (tilts), e.g., as described below.

In some demonstrative embodiments, application 160 may be configured to determine the index of refraction of the lens, for example, by analyzing two or more images captured at different lens tilts, e.g., relative to the axis between the depth sensor and the lens; deriving at least two angles of the lens; and determining the index of refraction, for example, based on a change in powers perceived at each of the lens tilts of the lens, and the angle of the lens tilt.

In some demonstrative embodiments, application 160 may be configured to determine one or more parameters of the tested lens, for example, based on an image, e.g., an RGB image, of the reference object via the lens, e.g., in addition to the depth information of the reference object via the lens.

In one example, the depth map may be combined with the RGB image of the reference object via the lens, e.g., when the depth map is captured, for example, by applying a registration between the depth map and the RGB image, and using image processing techniques, for example, to analyze a size of the reference object through the lens, and the depth map data.

In some demonstrative embodiments, application 160 may be configured to determine a cylindrical power and/or a cylindrical axis, for example, of a cylindrical lens, for example, based on the RGB image and the depth map, e.g., as described below.

In some demonstrative embodiments, the reference object may include a planar object with one or more features having a different size, e.g., scattered across the planar object.

In some demonstrative embodiments, application 160 may be configured to determine sizes and/or locations of the one or more features, for example, based on the depth map of the reference object.

In some demonstrative embodiments, application 160 may be configured to process a first captured image including images of the one or more features captured not via the lens; to process a second captured image including images of the one or more features captured via the lens; and to determine the one or more optical parameters of the lens, for example, based on a comparison between sizes of the images of the one or more features via the lens, sizes of the images of the one or more features not via the lens, and the sizes and locations of the one or more features, e.g., as described below.

In some demonstrative embodiments, application 160 may be configured to determine the one or more parameters of the cylindrical lens, for example, using a depth mapper including a calibrated stereo camera, e.g., such that each camera of the depth mapper is calibrated, and the planar object. For example, focusing of the camera upon the planar object may not be required.

In some demonstrative embodiments, application 160 may be configured to trigger, cause, and/or control depth mapper 118 to capture the first image of the planar object, for example, by at least one camera of depth mapper 118, for example, while the cylindrical lens is not present.

In some demonstrative embodiments, application 160 may be configured to detect the features in the first image and to assign to each feature metric properties. A location (x, y, z) of each feature, e.g., in a camera coordinate system, may be determined, for example, based on depth information and/or visual information.

In some demonstrative embodiments, application 160 may be configured to instruct the user of device 102 to place a cylindrical lens at the distance D2 from depth mapper 118, e.g., the mid-way between the wall and the device 102 or any other distance.

In one example, the distance D2 may be determined, for example, by assuming the cylindrical lens is at the middle between the wall and the device 102, or by depth mapper 118 for example, from an opaque rim of the lens or the glasses, e.g., as described above.

In some demonstrative embodiments, application 160 may be configured to instruct the user of device 102 to activate depth mapper 118 to capture depth map information via the lens, for example, when the lens is between device 102 and the background object.

In some demonstrative embodiments, application 160 may be configured to activate and/or cause depth mapper 118 to capture depth map information via the lens, for example, when the lens is between device 102 and the background object.

In some demonstrative embodiments, application 160 may be configured to trigger, cause, and/or control depth mapper 118 to capture, for example, by at least one camera of depth mapper 118, the second image of the features via the cylindrical lens.

In some demonstrative embodiments, application 160 may be configured to detect the features and/or to map the features to the first image.

In some demonstrative embodiments, application 160 may be configured to determine a transformation function or matrix from the first image, e.g., the original lens-less features map, to the second image, e.g., the "through-lens" feature map.

In one example, for a degenerated spherical lens, the transformation may include translation and scale, with a scale parameter used to calculate sphere.

In another example, for a sphero-cylindrical lens, the transformation may include translation, rotation and/or scale operations.

In some demonstrative embodiments, application 160 may be configured to isolate the rotation axis and scale in a direction of transformation, for example, to determine the one or more optical parameters, for example, by decomposing the transformation matrix into translation, rotation and/or scale matrices. For example, the scale and rotation parameters to determine the one or more optical parameters may be defined and/or determined using any suitable method.

Figure 14:
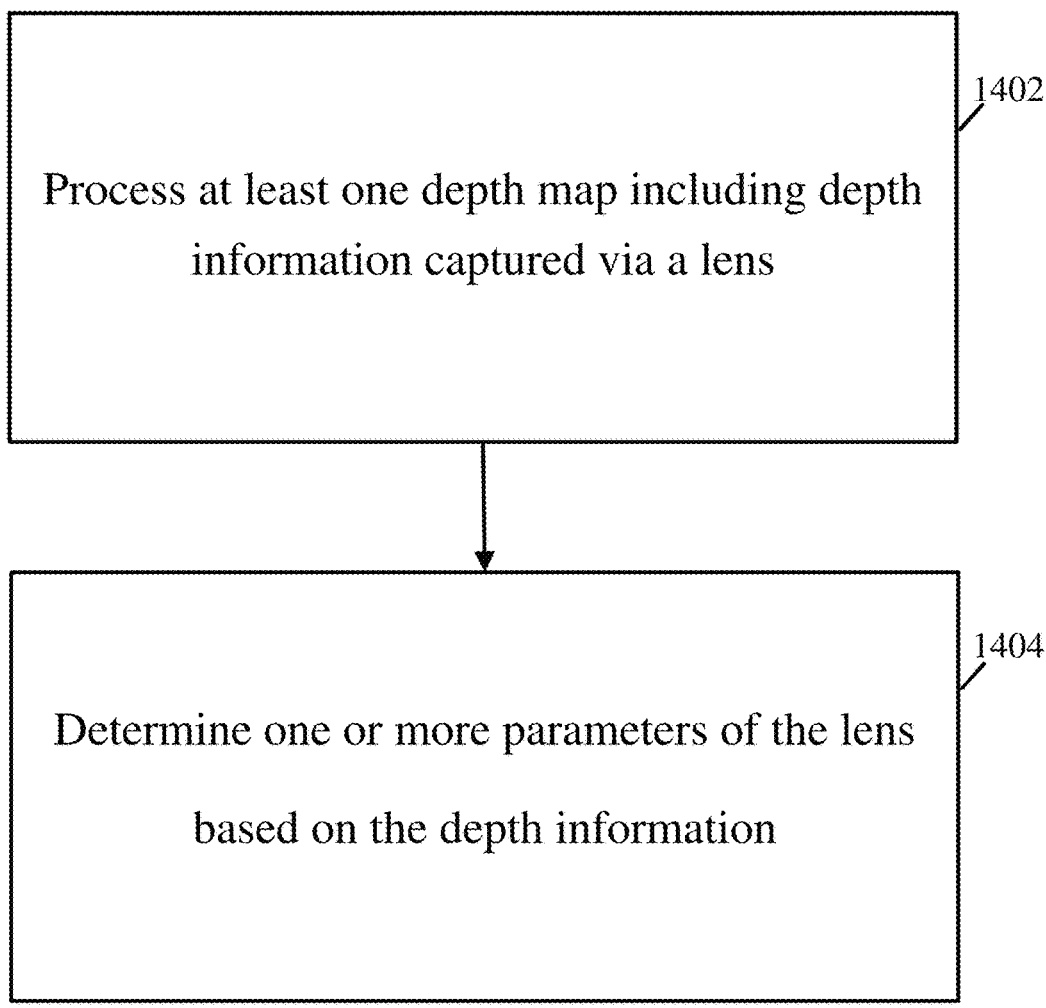
FIG. 14 is a schematic flow-chart illustration of a method of determining one or more parameters of a lens, in accordance with some demonstrative embodiments.

Reference is made to FIG. 14, which schematically illustrates a method of determining one or more parameters of a lens, in accordance with some demonstrative embodiments. For example, one or more operations of the method of FIG. 14 may be performed by a system, e.g., system 100 (FIG. 1); a device, e.g., device 102 (FIG. 1); a server, e.g., server 170 (FIG. 1); and/or an application, e.g., application 160 (FIG. 1).

In some demonstrative embodiments, as indicated at block 1402, the method may include processing at least one depth map including depth information captured via a lens.

For example, application 160 (FIG. 1) may process the at least one depth map from depth mapper 118 (FIG. 1) including the depth information captured via the lens, e.g., as described above.

In some demonstrative embodiments, as indicated at block 1404, the method may include determining one or more parameters of the lens based on the depth information. For example, application 160 (FIG. 1) may determine one or more parameters of the lens based on the depth information from depth mapper 118 (FIG. 1), e.g., as described above.

Figure 15:
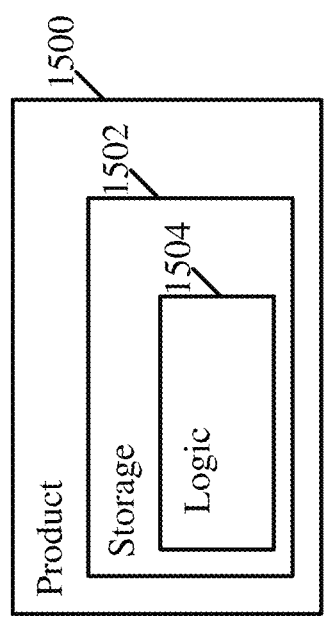
FIG. 15 is a schematic illustration of a product, in accordance with some demonstrative embodiments.

Reference is made to FIG. 15, which schematically illustrates a product of manufacture 1500, in accordance with some demonstrative embodiments. Product 1500 may include one or more tangible computer-readable non-transitory storage media 1502, which may include computer-executable instructions, e.g., implemented by logic 1504, operable to, when executed by at least one computer processor, enable the at least one computer processor to implement one or more operations at device 102 (FIG. 1), server 170 (FIG. 1), depth mapper 118 (FIG. 1), and/or application 160 (FIG. 1), and/or to perform, trigger and/or implement one or more operations, communications and/or functionalities according to one or more FIGS. 1-14, and/or one or more operations described herein. The phrase "non-transitory machine-readable medium" is directed to include all computer-readable media, with the sole exception being a transitory propagating signal.

In some demonstrative embodiments, product 1500 and/or machine-readable storage medium 1502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a Solid State Drive (SSD), a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a product comprising one or more tangible computer-readable non-transitory storage media comprising computer-executable instructions operable to, when executed by at least one computer processor, enable the at least one computer processor to cause a computing device to process at least one depth map comprising depth information captured via a lens; and determine one or more parameters of the lens based on the depth information.

Example 2 includes the subject matter of Example 1, and optionally, wherein the instructions, when executed, cause the computing device to identify in the depth map a depth value corresponding to an object, and to determine the one or more parameters of the lens based on the depth value corresponding to the object, a first distance, and a second distance, the first distance is between the object and a depth sensor, the second distance is between the depth sensor and the lens.

Example 3 includes the subject matter of Example 2, and optionally, wherein the instructions, when executed, cause the computing device to identify in the depth map depth information captured not via the lens, and to determine at least one of the first distance or the second distance based on the depth information captured not via the lens.

Example 4 includes the subject matter of Example 2 or 3, and optionally, wherein the instructions, when executed, cause the computing device to identify in the depth map an area corresponding to an element on plane of the lens, and to determine the second distance based on depth information in the area corresponding to the element.

Example 5 includes the subject matter of Example 4, and optionally, wherein the element comprises an opaque rim of the lens, or a frame holding the lens.

Example 6 includes the subject matter of any one of Examples 2-5, and optionally, wherein the instructions, when executed, cause the computing device to identify in the depth map an area corresponding to a plane comprising the object, and to determine the second distance based on depth information in the area corresponding to the plane comprising the element.

Example 7 includes the subject matter of any one of Examples 2-6, and optionally, wherein the object comprises a wall.

Example 8 includes the subject matter of any one of Examples 2-7, and optionally, wherein the instructions, when executed, cause the computing device to instruct a user to move at least one of the depth sensor or the lens until reaching a particular setting of at least one of the first distance or the second distance.

Example 9 includes the subject matter of any one of Examples 2-8, and optionally, wherein the instructions, when executed, cause the computing device to instruct a user to position the lens on a mirror such the first distance comprises an optical distance which is twice a distance between the depth sensor and the mirror.

Example 10 includes the subject matter of any one of Examples 2-9, and optionally, wherein the instructions, when executed, cause the computing device to instruct a user to position the lens relative the depth sensor such that the second distance is half of the first distance.

Example 11 includes the subject matter of any one of Examples 1-10, and optionally, wherein the instructions, when executed, cause the computing device to instruct a user to position the lens between a depth sensor and an object, such that the depth information comprises depth information of the object captured by the depth sensor via the lens.

Example 12 includes the subject matter of any one of Examples 1-11, and optionally, wherein the instructions, when executed, cause the computing device to identify in the depth map an area corresponding to the lens, and to determine the one or more parameters of the lens based on a dimension of the area corresponding to the lens.

Example 13 includes the subject matter of any one of Examples 1-12, and optionally, wherein the instructions, when executed, cause the computing device to determine the one or more parameters of the lens based on a plurality of different depth maps captured via the lens.

Example 14 includes the subject matter of Example 13, and optionally, wherein the plurality of different depth maps comprise at least a first depth map and a second depth map, the first depth map captured via the lens when the lens is at a first position relative to a depth sensor, the second depth map captured via the lens when the lens is at a second position, different from the first position, relative to the depth sensor.

Example 15 includes the subject matter of Example 13 or 14, and optionally, wherein the plurality of different depth maps comprise at least a first depth map and a second depth map, the first depth map comprises a depth map captured via the lens when the lens is at a first rotation angle in a plane of the lens, and the second depth map comprises a depth map captured via the lens when the lens is at a second rotation angle in the plane of the lens.

Example 16 includes the subject matter of Example 15, and optionally, wherein the instructions, when executed, cause the computing device to determine at least one of a cylindrical axis of the lens or a cylindrical power of the lens based on the first and second depth maps.

Example 17 includes the subject matter of any one of Examples 1-12, and optionally, wherein the instructions, when executed, cause the computing device to determine the one or more parameters of the lens based on a single depth map captured via the lens.

Example 18 includes the subject matter of any one of Examples 1-17, and optionally, wherein the instructions, when executed, cause the computing device to identify in the depth map one or more depth values captured via the lens, and to determine the one or more parameters of the lens based on the one or more depth values captured via the lens.

Example 19 includes the subject matter of any one of Examples 1-18, and optionally, wherein the instructions, when executed, cause the computing device to identify in the depth map one or more first depth values captured via the lens, and one or more second depth values captured not via the lens, and to determine the one or more parameters of the lens based on the first and second depth values.

Example 20 includes the subject matter of any one of Examples 1-19, and optionally, wherein the instructions, when executed, cause the computing device to process image information of an image of an object captured by a camera via the lens when the lens is between the camera and the object, to determine a magnification value based on a magnification between an imaged dimension of the object and an actual dimension of the object, and to determine the one or more parameters of the lens based on the depth information and the magnification value.

Example 21 includes the subject matter of any one of Examples 1-20, and optionally, wherein the instructions, when executed, cause the computing device to determine the one or more parameters of the lens based on one or more configuration parameters of a depth sensor from which the depth map is provided.

Example 22 includes the subject matter of Example 21, and optionally, wherein the one or more configuration parameters comprise a type of the depth sensor.

Example 23 includes the subject matter of Example 21 or 22, and optionally, wherein the one or more configuration parameters comprise a wavelength of electromagnetic radiation utilized by the depth sensor for generating the depth map.

Example 24 includes the subject matter of any one of Examples 1-23, and optionally, wherein the instructions, when executed, cause the computing device to determine the one or more parameters of the lens by processing the depth information as depth information of a structured-light depth measurement.

Example 25 includes the subject matter of any one of Examples 1-23, and optionally, wherein the instructions, when executed, cause the computing device to determine the one or more parameters of the lens by processing the depth information as depth information of a Time-of Flight (ToF) depth measurement.

Example 26 includes the subject matter of any one of Examples 1-25, and optionally, wherein the instructions, when executed, cause the computing device to determine the one or more parameters of the lens based on predefined mapping information to map between a plurality of depth-map measurements and a plurality of estimated optical parameters.

Example 27 includes the subject matter of any one of Examples 1-26, and optionally, wherein the instructions, when executed, cause the computing device to determine the one or more optical parameters for a sphero-cylindrical lens.

Example 28 includes the subject matter of any one of Examples 1-26, and optionally, wherein the instructions, when executed, cause the computing device to determine the one or more optical parameters for a bifocal lens or a multifocal lens.

Example 29 includes the subject matter of any one of Examples 1-28, and optionally, wherein the one or more parameters of the lens comprise at least one of a spherical power of the lens, a cylindrical power of the lens, a cylindrical axis of the lens, a sign of the lens, or a center of the lens.

Example 30 includes a device comprising a depth sensor to generate a depth map comprising depth information captured via a lens; and a lensometer module to determine one or more parameters of the lens based at least on the depth map.

Example 31 includes the subject matter of Example 30, and optionally, wherein the lensometer module is to identify in the depth map a depth value corresponding to an object, and to determine the one or more parameters of the lens based on the depth value corresponding to the object, a first distance, and a second distance, the first distance is between the object and a depth sensor, the second distance is between the depth sensor and the lens.

Example 32 includes the subject matter of Example 31, and optionally, wherein the lensometer module is to identify in the depth map depth information captured not via the lens, and to determine at least one of the first distance or the second distance based on the depth information captured not via the lens.

Example 33 includes the subject matter of Example 31 or 32, and optionally, wherein the lensometer module is to identify in the depth map an area corresponding to an element on plane of the lens, and to determine the second distance based on depth information in the area corresponding to the element.

Example 34 includes the subject matter of Example 33, and optionally, wherein the element comprises an opaque rim of the lens, or a frame holding the lens.

Example 35 includes the subject matter of any one of Examples 31-34, and optionally, wherein the lensometer module is to identify in the depth map an area corresponding to a plane comprising the object, and to determine the second distance based on depth information in the area corresponding to the plane comprising the element.

Example 36 includes the subject matter of any one of Examples 31-35, and optionally, wherein the object comprises a wall.

Example 37 includes the subject matter of any one of Examples 31-36, and optionally, wherein the lensometer module is to instruct a user to move at least one of the depth sensor or the lens until reaching a particular setting of at least one of the first distance or the second distance.

Example 38 includes the subject matter of any one of Examples 31-37, and optionally, wherein the lensometer module is to instruct a user to position the lens on a mirror such the first distance comprises an optical distance which is twice a distance between the depth sensor and the mirror.

Example 39 includes the subject matter of any one of Examples 31-38, and optionally, wherein the lensometer module is to instruct a user to position the lens relative the depth sensor such that the second distance is half of the first distance.

Example 40 includes the subject matter of any one of Examples 30-39, and optionally, wherein the lensometer module is to instruct a user to position the lens between a depth sensor and an object, such that the depth information comprises depth information of the object captured by the depth sensor via the lens.

Example 41 includes the subject matter of any one of Examples 30-40, and optionally, wherein the lensometer module is to identify in the depth map an area corresponding to the lens, and to determine the one or more parameters of the lens based on a dimension of the area corresponding to the lens.

Example 42 includes the subject matter of any one of Examples 30-41, and optionally, wherein the lensometer module is to determine the one or more parameters of the lens based on a plurality of different depth maps captured via the lens.

Example 43 includes the subject matter of Example 42, and optionally, wherein the plurality of different depth maps comprise at least a first depth map and a second depth map, the first depth map captured via the lens when the lens is at a first position relative to a depth sensor, the second depth map captured via the lens when the lens is at a second position, different from the first position, relative to the depth sensor.

Example 44 includes the subject matter of Example 42 or 43, and optionally, wherein the plurality of different depth maps comprise at least a first depth map and a second depth map, the first depth map comprises a depth map captured via the lens when the lens is at a first rotation angle in a plane of the lens, and the second depth map comprises a depth map captured via the lens when the lens is at a second rotation angle in the plane of the lens.

Example 45 includes the subject matter of Example 44, and optionally, wherein the lensometer module is to determine at least one of a cylindrical axis of the lens or a cylindrical power of the lens based on the first and second depth maps.

Example 46 includes the subject matter of any one of Examples 30-41, and optionally, wherein the lensometer module is to determine the one or more parameters of the lens based on a single depth map captured via the lens.

Example 47 includes the subject matter of any one of Examples 30-46, and optionally, wherein the lensometer module is to identify in the depth map one or more depth values captured via the lens, and to determine the one or more parameters of the lens based on the one or more depth values captured via the lens.

Example 48 includes the subject matter of any one of Examples 30-47, and optionally, wherein the lensometer module is to identify in the depth map one or more first depth values captured via the lens, and one or more second depth values captured not via the lens, and to determine the one or more parameters of the lens based on the first and second depth values.

Example 49 includes the subject matter of any one of Examples 30-48, and optionally, wherein the lensometer module is to process image information of an image of an object captured by a camera via the lens when the lens is between the camera and the object, to determine a magnification value based on a magnification between an imaged dimension of the object and an actual dimension of the object, and to determine the one or more parameters of the lens based on the depth information and the magnification value.

Example 50 includes the subject matter of any one of Examples 30-49, and optionally, wherein the lensometer module is to determine the one or more parameters of the lens based on one or more configuration parameters of a depth sensor from which the depth map is provided.

Example 51 includes the subject matter of Example 50, and optionally, wherein the one or more configuration parameters comprise a type of the depth sensor.

Example 52 includes the subject matter of Example 50 or 51, and optionally, wherein the one or more configuration parameters comprise a wavelength of electromagnetic radiation utilized by the depth sensor for generating the depth map.

Example 53 includes the subject matter of any one of Examples 30-52, and optionally, wherein the lensometer module is to determine the one or more parameters of the lens by processing the depth information as depth information of a structured-light depth measurement.

Example 54 includes the subject matter of any one of Examples 30-52, and optionally, wherein the lensometer module is to determine the one or more parameters of the lens by processing the depth information as depth information of a Time-of Flight (ToF) depth measurement.

Example 55 includes the subject matter of any one of Examples 30-54, and optionally, wherein the lensometer module is to determine the one or more parameters of the lens based on predefined mapping information to map between a plurality of depth-map measurements and a plurality of estimated optical parameters.

Example 56 includes the subject matter of any one of Examples 30-55, and optionally, wherein the lensometer module is to determine the one or more optical parameters for a sphero-cylindrical lens.

Example 57 includes the subject matter of any one of Examples 30-55, and optionally, wherein the lensometer module is to determine the one or more optical parameters for a bifocal lens or a multifocal lens.

Example 58 includes the subject matter of any one of Examples 30-57, and optionally, wherein the one or more parameters of the lens comprise at least one of a spherical power of the lens, a cylindrical power of the lens, a cylindrical axis of the lens, a sign of the lens, or a center of the lens.

Example 59 includes a method of determining one or more optical parameters of a lens, the method comprising processing at least one depth map comprising depth information captured via the lens; and determining the one or more parameters of the lens based at least on the depth map.

Example 60 includes the subject matter of Example 59, and optionally, comprising identifying in the depth map a depth value corresponding to an object, and determining the one or more parameters of the lens based on the depth value corresponding to the object, a first distance, and a second distance, the first distance is between the object and a depth sensor, the second distance is between the depth sensor and the lens.

Example 61 includes the subject matter of Example 60, and optionally, comprising identifying in the depth map depth information captured not via the lens, and determining at least one of the first distance or the second distance based on the depth information captured not via the lens.

Example 62 includes the subject matter of Example 60 or 61, and optionally, comprising identifying in the depth map an area corresponding to an element on plane of the lens, and determining the second distance based on depth information in the area corresponding to the element.

Example 63 includes the subject matter of Example 62, and optionally, wherein the element comprises an opaque rim of the lens, or a frame holding the lens.

Example 64 includes the subject matter of any one of Examples 60-63, and optionally, comprising identifying in the depth map an area corresponding to a plane comprising the object, and determining the second distance based on depth information in the area corresponding to the plane comprising the element.

Example 65 includes the subject matter of any one of Examples 60-64, and optionally, wherein the object comprises a wall.

Example 66 includes the subject matter of any one of Examples 60-65, and optionally, comprising instructing a user to move at least one of the depth sensor or the lens until reaching a particular setting of at least one of the first distance or the second distance.

Example 67 includes the subject matter of any one of Examples 60-66, and optionally, comprising instructing a user to position the lens on a mirror such the first distance comprises an optical distance which is twice a distance between the depth sensor and the mirror.

Example 68 includes the subject matter of any one of Examples 60-67, and optionally, comprising instructing a user to position the lens relative the depth sensor such that the second distance is half of the first distance.

Example 69 includes the subject matter of any one of Examples 59-68, and optionally, comprising instructing a user to position the lens between a depth sensor and an object, such that the depth information comprises depth information of the object captured by the depth sensor via the lens.

Example 70 includes the subject matter of any one of Examples 59-69, and optionally, comprising identifying in the depth map an area corresponding to the lens, and determining the one or more parameters of the lens based on a dimension of the area corresponding to the lens.

Example 71 includes the subject matter of any one of Examples 59-70, and optionally, comprising determining the one or more parameters of the lens based on a plurality of different depth maps captured via the lens.

Example 72 includes the subject matter of Example 71, and optionally, wherein the plurality of different depth maps comprise at least a first depth map and a second depth map, the first depth map captured via the lens when the lens is at a first position relative to a depth sensor, the second depth map captured via the lens when the lens is at a second position, different from the first position, relative to the depth sensor.

Example 73 includes the subject matter of Example 71 or 72, and optionally, wherein the plurality of different depth maps comprise at least a first depth map and a second depth map, the first depth map comprises a depth map captured via the lens when the lens is at a first rotation angle in a plane of the lens, and the second depth map comprises a depth map captured via the lens when the lens is at a second rotation angle in the plane of the lens.

Example 74 includes the subject matter of Example 73, and optionally, comprising determining at least one of a cylindrical axis of the lens or a cylindrical power of the lens based on the first and second depth maps.

Example 75 includes the subject matter of any one of Examples 59-70, and optionally, comprising determining the one or more parameters of the lens based on a single depth map captured via the lens.

Example 76 includes the subject matter of any one of Examples 59-75, and optionally, comprising identifying in the depth map one or more depth values captured via the lens, and determining the one or more parameters of the lens based on the one or more depth values captured via the lens.

Example 77 includes the subject matter of any one of Examples 59-76, and optionally, comprising identifying in the depth map one or more first depth values captured via the lens, and one or more second depth values captured not via the lens, and determining the one or more parameters of the lens based on the first and second depth values.

Example 78 includes the subject matter of any one of Examples 59-77, and optionally, comprising processing image information of an image of an object captured by a camera via the lens when the lens is between the camera and the object, determining a magnification value based on a magnification between an imaged dimension of the object and an actual dimension of the object, and determining the one or more parameters of the lens based on the depth information and the magnification value.

Example 79 includes the subject matter of any one of Examples 59-78, and optionally, comprising determining the one or more parameters of the lens based on one or more configuration parameters of a depth sensor from which the depth map is provided.

Example 80 includes the subject matter of Example 79, and optionally, wherein the one or more configuration parameters comprise a type of the depth sensor.

Example 81 includes the subject matter of Example 79 or 80, and optionally, wherein the one or more configuration parameters comprise a wavelength of electromagnetic radiation utilized by the depth sensor for generating the depth map.

Example 82 includes the subject matter of any one of Examples 59-81, and optionally, comprising determining the one or more parameters of the lens by processing the depth information as depth information of a structured-light depth measurement.

Example 83 includes the subject matter of any one of Examples 59-81, and optionally, comprising determining the one or more parameters of the lens by processing the depth information as depth information of a Time-of Flight (ToF) depth measurement.

Example 84 includes the subject matter of any one of Examples 59-83, and optionally, comprising determining the one or more parameters of the lens based on predefined mapping information to map between a plurality of depth-map measurements and a plurality of estimated optical parameters.

Example 85 includes the subject matter of any one of Examples 59-84, and optionally, comprising determining the one or more optical parameters for a sphero-cylindrical lens.

Example 86 includes the subject matter of any one of Examples 59-84, and optionally, comprising determining the one or more optical parameters for a bifocal lens or a multifocal lens.

Example 87 includes the subject matter of any one of Examples 59-86, and optionally, wherein the one or more parameters of the lens comprise at least one of a spherical power of the lens, a cylindrical power of the lens, a cylindrical axis of the lens, a sign of the lens, or a center of the lens.

Example 88 includes an apparatus of determining one or more optical parameters of a lens, the apparatus comprising means for processing at least one depth map comprising depth information captured via the lens; and means for determining the one or more parameters of the lens based at least on the depth map.

Example 89 includes the subject matter of Example 88, and optionally, comprising means for identifying in the depth map a depth value corresponding to an object, and determining the one or more parameters of the lens based on the depth value corresponding to the object, a first distance, and a second distance, the first distance is between the object and a depth sensor, the second distance is between the depth sensor and the lens.

Example 90 includes the subject matter of Example 89, and optionally, comprising means for identifying in the depth map depth information captured not via the lens, and determining at least one of the first distance or the second distance based on the depth information captured not via the lens.

Example 91 includes the subject matter of Example 89 or 90, and optionally, comprising means for identifying in the depth map an area corresponding to an element on plane of the lens, and determining the second distance based on depth information in the area corresponding to the element.

Example 92 includes the subject matter of Example 91, and optionally, wherein the element comprises an opaque rim of the lens, or a frame holding the lens.

Example 93 includes the subject matter of any one of Examples 89-92, and optionally, comprising means for identifying in the depth map an area corresponding to a plane comprising the object, and determining the second distance based on depth information in the area corresponding to the plane comprising the element.

Example 94 includes the subject matter of any one of Examples 89-93, and optionally, wherein the object comprises a wall.

Example 95 includes the subject matter of any one of Examples 89-94, and optionally, comprising means for instructing a user to move at least one of the depth sensor or the lens until reaching a particular setting of at least one of the first distance or the second distance.

Example 96 includes the subject matter of any one of Examples 89-95, and optionally, comprising means for instructing a user to position the lens on a mirror such the first distance comprises an optical distance which is twice a distance between the depth sensor and the mirror.

Example 97 includes the subject matter of any one of Examples 89-96, and optionally, comprising means for instructing a user to position the lens relative the depth sensor such that the second distance is half of the first distance.

Example 98 includes the subject matter of any one of Examples 88-97, and optionally, comprising means for instructing a user to position the lens between a depth sensor and an object, such that the depth information comprises depth information of the object captured by the depth sensor via the lens.

Example 99 includes the subject matter of any one of Examples 88-98, and optionally, comprising means for identifying in the depth map an area corresponding to the lens, and determining the one or more parameters of the lens based on a dimension of the area corresponding to the lens.

Example 100 includes the subject matter of any one of Examples 88-99, and optionally, comprising means for determining the one or more parameters of the lens based on a plurality of different depth maps captured via the lens.

Example 101 includes the subject matter of Example 100, and optionally, wherein the plurality of different depth maps comprise at least a first depth map and a second depth map, the first depth map captured via the lens when the lens is at a first position relative to a depth sensor, the second depth map captured via the lens when the lens is at a second position, different from the first position, relative to the depth sensor.

Example 102 includes the subject matter of Example 100 or 101, and optionally, wherein the plurality of different depth maps comprise at least a first depth map and a second depth map, the first depth map comprises a depth map captured via the lens when the lens is at a first rotation angle in a plane of the lens, and the second depth map comprises a depth map captured via the lens when the lens is at a second rotation angle in the plane of the lens.

Example 103 includes the subject matter of Example 102, and optionally, comprising means for determining at least one of a cylindrical axis of the lens or a cylindrical power of the lens based on the first and second depth maps.

Example 104 includes the subject matter of any one of Examples 88-99, and optionally, comprising means for determining the one or more parameters of the lens based on a single depth map captured via the lens.

Example 105 includes the subject matter of any one of Examples 88-104, and optionally, comprising means for identifying in the depth map one or more depth values captured via the lens, and determining the one or more parameters of the lens based on the one or more depth values captured via the lens.

Example 106 includes the subject matter of any one of Examples 88-105, and optionally, comprising means for identifying in the depth map one or more first depth values captured via the lens, and one or more second depth values captured not via the lens, and determining the one or more parameters of the lens based on the first and second depth values.

Example 107 includes the subject matter of any one of Examples 88-106, and optionally, comprising means for processing image information of an image of an object captured by a camera via the lens when the lens is between the camera and the object, determining a magnification value based on a magnification between an imaged dimension of the object and an actual dimension of the object, and determining the one or more parameters of the lens based on the depth information and the magnification value.

Example 108 includes the subject matter of any one of Examples 88-107, and optionally, comprising means for determining the one or more parameters of the lens based on one or more configuration parameters of a depth sensor from which the depth map is provided.

Example 109 includes the subject matter of Example 108, and optionally, wherein the one or more configuration parameters comprise a type of the depth sensor.

Example 110 includes the subject matter of Example 108 or 109, and optionally, wherein the one or more configuration parameters comprise a wavelength of electromagnetic radiation utilized by the depth sensor for generating the depth map.

Example 111 includes the subject matter of any one of Examples 88-110, and optionally, comprising means for determining the one or more parameters of the lens by processing the depth information as depth information of a structured-light depth measurement.

Example 112 includes the subject matter of any one of Examples 88-110, and optionally, comprising means for determining the one or more parameters of the lens by processing the depth information as depth information of a Time-of Flight (ToF) depth measurement.

Example 113 includes the subject matter of any one of Examples 88-112, and optionally, comprising means for determining the one or more parameters of the lens based on predefined mapping information to map between a plurality of depth-map measurements and a plurality of estimated optical parameters.

Example 114 includes the subject matter of any one of Examples 88-113, and optionally, comprising means for determining the one or more optical parameters for a spherocylindrical lens.

Example 115 includes the subject matter of any one of Examples 88-113, and optionally, comprising means for determining the one or more optical parameters for a bifocal lens or a multifocal lens.

Example 116 includes the subject matter of any one of Examples 88-115, and optionally, wherein the one or more parameters of the lens comprise at least one of a spherical power of the lens, a cylindrical power of the lens, a cylindrical axis of the lens, a sign of the lens, or a center of the lens.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A product comprising one or more tangible computer-readable non-transitory storage media comprising computer-executable instructions operable to, when executed by at least one computer processor, enable the at least one computer processor to cause a computing device to:
   process at least one depth map comprising first depth information of a reference object and second depth information of an opaque object, wherein the first depth information includes a first sensed depth value of the reference object as captured by a depth sensor via a lens, wherein the second depth information includes a second sensed depth value of the opaque object as captured by the depth sensor not via the lens; and
   determine one or more parameters of the lens based on the first depth information, the second depth information, a first distance between the reference object and the depth sensor, and a second distance between the depth sensor and the lens, wherein the opaque object is substantially positioned at the second distance from the depth sensor.

2. The product of claim 1, wherein the instructions, when executed, cause the computing device to determine at least one of the first distance or the second distance based on the second depth information or based on third depth information captured by the depth sensor not via the lens.

3. The product of claim 1, wherein the instructions, when executed, cause the computing device to identify in the depth map an area corresponding to an element on plane of the lens, and to determine the second distance based on depth information in the area corresponding to the element.

4. The product of claim 1, wherein the instructions, when executed, cause the computing device to identify in the depth map an area corresponding to a plane comprising the reference object, and to determine the second distance based on depth information in the area corresponding to the plane comprising the element.

5. The product of claim 1, wherein the instructions, when executed, cause the computing device to instruct a user to move at least one of the depth sensor or the lens until reaching a particular setting of at least one of the first distance or the second distance.

6. The product of claim 1, wherein the instructions, when executed, cause the computing device to instruct a user to position the lens on a mirror such the first distance comprises an optical distance which is twice a distance between the depth sensor and the mirror.

7. The product of claim 1, wherein the instructions, when executed, cause the computing device to instruct a user to position the lens relative the depth sensor such that the second distance is half of the first distance.

8. The product of claim 1, wherein the instructions, when executed, cause the computing device to instruct a user to position the lens between the depth sensor and the reference object.

9. The product of claim 1, wherein the instructions, when executed, cause the computing device to identify in the at least one depth map an area corresponding to the lens, and to determine the one or more parameters of the lens based on a dimension of the area corresponding to the lens.

10. The product of claim 1, wherein the instructions, when executed, cause the computing device to determine the one or more parameters of the lens based on a plurality of different depth maps captured via the lens.

11. The product of claim 10, wherein the plurality of different depth maps comprise at least a first depth map and a second depth map, the first depth map captured via the lens when the lens is at a first position relative to a depth sensor, the second depth map captured via the lens when the lens is at a second position, different from the first position, relative to the depth sensor.

12. The product of claim 10, wherein the plurality of different depth maps comprise at least a first depth map and a second depth map, the first depth map comprises a depth map captured via the lens when the lens is at a first rotation angle in a plane of the lens, and the second depth map comprises a depth map captured via the lens when the lens is at a second rotation angle in the plane of the lens.

13. The product of claim 12, wherein the instructions, when executed, cause the computing device to determine at least one of a cylindrical axis of the lens or a cylindrical power of the lens based on the first and second depth maps.

14. The product of claim 1, wherein the instructions, when executed, cause the computing device to identify in the at least one depth map at least two depth values captured via the lens, and to determine the one or more parameters of the lens based on the at least two depth values captured via the lens.

15. The product of claim 1, wherein the instructions, when executed, cause the computing device to identify in the at least one depth map one or more first depth values captured via the lens, and one or more second depth values captured not via the lens, and to determine the one or more parameters of the lens based on the first and second depth values.

16. The product of claim 1, wherein the instructions, when executed, cause the computing device to process image information of an image of the reference object captured by a camera via the lens when the lens is between the camera and the reference object, to determine a magnification value based on a magnification between an imaged dimension of the object and an actual dimension of the reference object, and to determine the one or more parameters of the lens based on the first depth information and the magnification value.

17. The product of claim 1, wherein the instructions, when executed, cause the computing device to determine the one or more parameters of the lens based on one or more configuration parameters of the depth sensor.

18. The product of claim 1, wherein the instructions, when executed, cause the computing device to determine the one or more parameters of the lens by processing the first depth information as depth information of a structured-light depth measurement.

19. The product of claim 1, wherein the instructions, when executed, cause the computing device to determine the one or more parameters of the lens by processing the first depth information as depth information of a Time-of Flight (ToF) depth measurement.

20. The product of claim 1, wherein the instructions, when executed, cause the computing device to determine the one or more parameters of the lens based on predefined mapping information to map between a plurality of depth-map measurements and a plurality of estimated optical parameters.

21. The product of claim 1, wherein the instructions, when executed, cause the computing device to determine the one or more optical parameters for a sphero-cylindrical lens.

22. The product of claim 1, wherein the instructions, when executed, cause the computing device to determine the one or more optical parameters for a bifocal lens or a multifocal lens.

23. The product of claim 1, wherein the one or more parameters of the lens comprise at least one of a spherical power of the lens, a cylindrical power of the lens, a cylindrical axis of the lens, a sign of the lens, or a center of the lens.

24. A device comprising:
a structured light projector to project a structured object through a lens;
a depth sensor to generate a depth map comprising depth information sensed in the structured object projected from the structured light projector, the depth map including:
a first sensed depth value of a reference object as the structured object is detected not via the lens;
a second sensed depth value of the reference object as the structured object is detected via the lens; and
a third sensed depth value of an opaque object separate from the reference object; and
a lensometer module to determine one or more parameters of the lens based at least on the first sensed depth value, the second sensed depth value, and the third sensed depth value of the depth map.

25. The device of claim 24, wherein the lensometer module is further configured to determine the one or more parameters of the lens based on a third sensed depth value of an opaque object separate from the reference object.

26. An apparatus of determining one or more optical parameters of a lens, the apparatus comprising:
means for processing a depth map comprising:
a first depth distance between a reference object and a depth sensor as captured by the depth sensor via a lens; and
a second depth distance between the reference object and the depth sensor as captured by the depth sensor not via the lens; and
means for determining the one or more parameters of the lens based at least on the first depth distance, the second depth distance, and a distance between the depth sensor and the lens.

* * * * *